United States Patent
Lewbel et al.

(10) Patent No.: US 11,205,013 B2
(45) Date of Patent: Dec. 21, 2021

(54) CONTROLLING DISCLOSURE OF IDENTITIES IN COMMUNICATION SESSIONS

(71) Applicant: MICROSOFT TECHNOLOGY LICENSING, LLC, Redmond, WA (US)

(72) Inventors: Hannah Rebecca Lewbel, Kirkland, WA (US); Isabel Sophie Sharp, Seattle, WA (US); Adam Michael Gleisner, Seattle, WA (US); Lindsey Conway, Seattle, WA (US); Clea Allington, Seattle, WA (US); Minu George, Sammamish, WA (US); Samantha Robbie Courts, Bellevue, WA (US); Margaret Arlene Grounds, Kirkland, WA (US); Scott H. W. Snyder, Seattle, WA (US); Nassr Albahadly, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 59 days.

(21) Appl. No.: 16/660,678

(22) Filed: Oct. 22, 2019

(65) Prior Publication Data
US 2021/0117573 A1 Apr. 22, 2021

(51) Int. Cl.
*G06F 21/62* (2013.01)
*H04L 12/18* (2006.01)

(52) U.S. Cl.
CPC ...... *G06F 21/6254* (2013.01); *H04L 12/1822* (2013.01); *H04L 12/1831* (2013.01)

(58) Field of Classification Search
CPC . G06F 21/6254; G06F 3/048; H04L 12/1822; H04L 12/1831; H04L 65/403; H04L 65/4015
See application file for complete search history.

(56) References Cited

U.S. PATENT DOCUMENTS 8,099,458 B2 1/2012 Burtner et al.
9,082,106 B2 * 7/2015 Jones ............. G06Q 10/10
(Continued)

FOREIGN PATENT DOCUMENTS

WO 2016100413 A1 6/2016

OTHER PUBLICATIONS

"Administrator Guide foe Cisco Webex Room Kit"—Cisco Systems, Inc, Jun. 2018 https://www.cisco.com/c/dam/en/us/td/docs/telepresence/endpoint/ce94/room-kit-administrator-guide-ce94.pdf (Year: 2018).*

(Continued)

*Primary Examiner* — Randy A Scott
(74) *Attorney, Agent, or Firm* — Newport IP, LLC; Benjamin A. Keim

(57) ABSTRACT

Technologies are disclosed for a computing system that allows users to control the disclosure of their identities during communication sessions. Users can control the disclosure of their identities with respect to certain types of shared content. In one mode of operation, a user can share content anonymously. In another mode of operation, identity may be revealed when certain conditions are met or revealed to only certain other users. For example, the identity of a user who shared a comment anonymously may be revealed if multiple other users agree with that comment. In another mode of operation, the user's identity is revealed to all other users such as in a live video stream. The computing system can control display of users' identities based on user instruc- (Continued)

tions or based on triggering conditions. A user interface (UI) can show content items that identify a user together with content items that are shared anonymously.

20 Claims, 14 Drawing Sheets

(56) References Cited

U.S. PATENT DOCUMENTS

| | | |
|---|---|---|
| 10,126,927 B1 | 11/2018 | Fieldman |
| 2003/0189598 A1 | 10/2003 | Lipstein et al. |
| 2004/0025113 A1 | 2/2004 | Penke et al. |
| 2006/0031235 A1 | 2/2006 | Foresti et al. |
| 2006/0224430 A1 | 10/2006 | Butt |
| 2008/0022209 A1 | 1/2008 | Lyle |
| 2009/0052645 A1 | 2/2009 | Bansal et al. |
| 2009/0234721 A1 | 9/2009 | Bigelow et al. |
| 2010/0251153 A1 | 9/2010 | Sangiovanni |
| 2011/0078573 A1 | 3/2011 | Ooba |
| 2011/0268262 A1* | 11/2011 | Jones ............... H04M 3/42008 379/202.01 |
| 2012/0254773 A1* | 10/2012 | Viswanathan ........... G09B 5/02 715/753 |
| 2013/0091440 A1 | 4/2013 | Kotler |
| 2013/0191454 A1 | 7/2013 | Oliver et al. |
| 2014/0012614 A1 | 1/2014 | Beresford-Wood et al. |
| 2014/0082100 A1 | 3/2014 | Sammon et al. |
| 2015/0002435 A1 | 1/2015 | Shimizu et al. |
| 2015/0213395 A1 | 7/2015 | Swanson et al. |
| 2015/0341399 A1 | 11/2015 | Lee |
| 2016/0085381 A1 | 3/2016 | Parker et al. |
| 2016/0321227 A1 | 11/2016 | Keslin et al. |
| 2017/0090852 A1 | 3/2017 | Harada |
| 2018/0039951 A1 | 2/2018 | Wynn et al. |
| 2018/0060018 A1 | 3/2018 | Kunakhovich et al. |
| 2019/0013955 A1* | 1/2019 | Yoo ..................... H04L 12/1822 |
| 2020/0319778 A1 | 10/2020 | Lewbel et al. |
| 2021/0073743 A1 | 3/2021 | Fox et al. |

OTHER PUBLICATIONS

"Webex Frequently Asked Questions"—James Madison University, Jul. 2018 https://www.jmu.edu/computing/_files/WebEx_Outlook_FaQ.pdf (Year: 2018).*

"International Search Report and the Written Opinion Issued in PCT Application No. PCT/US20/052988", dated Dec. 23, 2020, 12 Pages.

"International Search Report and the Written Opinion Issued in PCT Application No. PCT/US20/052989", dated Jan. 18, 2021, 17 Pages.

"Final Office Action Issued in U.S. Appl. No. 16/377,940", dated Jun. 11, 2020, 18 Pages.

"International Search Report and Written Opinion Issued in PCT Application No. PCT/US2020/024350", dated Jun. 12, 2020, 11 Pages.

"Non-Final Office Action Issued in U.S. Appl. No. 16/377,940", dated Sep. 29, 2020, 18 Pages.

"Non-Final Office Action Issued in U.S. Appl. No. 16/377,940", dated Mar. 6, 2020, 16 Pages.

"International Search Report and Written Opinion Issued in PCT Application No. PCT/US20/052987", dated Mar. 10, 2021, 23 Pages.

"Notice of Allowance Issued in U.S. Appl. No. 16/660,744", dated Apr. 14, 2021, 9 Pages.

"Non Final Office Action Issued in U.S. Appl. No. 16/660,763", dated Jul. 29, 2021, 32 Pages.

\* cited by examiner

CONTROLLING DISCLOSURE OF IDENTITIES IN COMMUNICATION SESSIONS

BACKGROUND

Meetings are now frequently conducted using computing devices that join participants from separate locations together in a shared experience. During these shared experiences, users can share text, images, videos, live streams, and audio data. Sometimes the identity of each participant can be associated with shared content. For example, a user's identity may be revealed in response to an edit to a shared word processing document, an entry to a channel, or an entry to a document annotation. Systems that share a user's identity during communication sessions can be useful in giving credit to those who provide valuable contributions. Shared content may also be viewed as more trustworthy when the other recipients know the identity of the sender.

Although existing systems can allow users to share content and identities of each contributor, existing systems have a number of drawbacks. For example, existing systems do not allow users to control the disclosure of their identity when they share content. This shortcoming may prevent people from providing feedback or content, as some people may not feel comfortable revealing their identity under certain circumstances. This can lead to a number of inefficiencies with respect to computing resources, as existing systems may require users to share ideas and content using duplicative resources, such as private chat sessions or separate devices, in order to control the disclosure of their identity. When such methods are used, shared ideas may not be readily communicated to all members of a shared experience, which may lead to other inefficiencies and the redundant use of computing resources.

It is with respect to these and other considerations the disclosure made herein is presented.

SUMMARY

This disclosure provides techniques that allow users to control the disclosure of their identities during communication sessions. In some configurations, users can control the disclosure of their identities with respect to certain types of shared content and for individual content items. For instance, a user may share his or her identity for video content but choose to not share his or her identity for text messages or annotations to a shared document.

In some configurations, users can operate in different modes of operation to control the disclosure of their identity. In one mode of operation, a user can share content anonymously. In another mode of operation, the user may allow his or her identity to be revealed to certain users when certain conditions are met. For example, the identity of a user who anonymously shared a comment may be revealed if multiple recipients agree with that comment. As a further example, the user's identity may be revealed to a moderator but not to other participants in a communication session. In another mode of operation, the user's identity is revealed to all other users such as in a live video stream. In addition, a system can control the display of users' identities based on user instructions or based on the detection of other triggering conditions. A user interface (UI) for the communication session can show content items that identify a user together with content items that are shared anonymously.

Being able to control the disclosure of one's identity during a communication session provides many benefits. For example, some participants may feel reluctant to ask a question that could be construed to imply a lack of understanding of the topic. Participants may also wish to privately comment on the behavior (both good and bad) of other participants. The ability to communicate anonymously during a communication session can increase participation and communication leading to more inclusive meetings.

The systems described herein may control the display of the identity of a user who contributes content items. If the user chooses to communicate anonymously, content items can be shared among participants in the communication session without displaying the identity of the contributing user. The identities of recipients may also be kept private from each other. For example, each recipient may see only his or her name in association with shared content and not the identities of other recipients of the shared content.

Among other technical benefits, the techniques and systems disclosed herein can reduce utilization of computing resources by combining anonymous and non-anonymous content items in a single application or UI. By providing the ability to exchange anonymous content items as part of the communication session, participants can communicate with each other anonymously, without using redundant communication systems, e.g., launching separate applications or using separate electronic devices to communicate. The techniques disclosed herein can reduce the utilization of computing resources like processor cycles, memory usage, network bandwidth, and power consumption. This can also improve human-computer interaction by providing a single integrated UI that enhances usability and reduces input error as compared to a user attempting to complete the same tasks with multiple UIs or on separate devices.

An additional technical benefit of the disclosed techniques is an efficient and effective way to share anonymous content items among meeting participants without unwanted interjection of unsolicited messages from other sources unrelated to the communication session (e.g., spam messages). In some implementations, the anonymous meeting content items may be exchanged only among other participants in the same communication session. Thus, even though a content item is "anonymous," it could only have come from one of the participants in the communication session. This provides the technical benefits of reducing processor load, memory usage, and network traffic as compared to a communication session that allows anonymous messages from other sources (e.g., spammers).

In an implementation of these techniques, a first type of content (e.g., a live video stream) is sent to a first computing device and to a second computing device that are both concurrently participating in the same communication session. The first type of content may be broadcast by a server or other computing device that implements the communication session.

A second type of content (e.g., a text message) generated during a communication session may be anonymous. The anonymous content item is sent from a first computing device of a sender. The anonymous content item can include the content of the content item itself, an indication of one or more recipients and an indication that the content item is anonymous. This content item may be received by a second computing device of a recipient. Then the content is presented on the UI of the second computing device in a way that does not reveal the identity of the sender. The UI of the second computing device can display the anonymous second type of content and the attributed first type of content simultaneously in the communication session. This makes it possible for the recipient, who uses the second computing device, to receive the anonymous content item content without having to open an additional application and/or use a separate device. Thus, participants can receive and send anonymous content items from the same UI that presents other types of communication in the ongoing communication session.

In one implementation, dissemination of anonymous content items regarding a communication session may be provided by receiving from a sender the content item, an indication of recipients, and an indication that the content item is anonymous. This UI used by the sender to generate the anonymous content item can also simultaneously display other types of content shared in the communication session. A server or other device that implements the communication session may control display of the indication of the sender's identity on the UI of the recipient's computing device. This type of control and may omit or prevent display of the sender's identity to a first recipient. However, for a second content item recipient, such as a moderator of the communication session, the sender's identity may be displayed with the content item.

A UI of another computing device, such as the computing device of a moderator of the communication session, may present the sender's content item with an indication identifying the sender (e.g., a username). This content item is thus "attributed" because it is displayed in a way that attributes the content item to the sender. This content item from the sender is anonymous for most recipients because the sender's identity is not displayed via the UI. But the same content item may be attributed to the sender in a UI accessible to the moderator that displays the sender's identity.

In one implementation, the content of a content item, an indication of recipients, and an indication that the content item is anonymous may be received from an input region of a UI of a computing device of the sender. This UI can also simultaneously display other communication session content that identifies the users such as a live video stream. A server or other device that implements the communication session can control display of the indication of the sender for a first recipient in a way that omits or obscures the identity thereby rendering the content item anonymous.

The UI may also include a UI element that the recipient can use to indicate agreement with a sentiment of a content item. If an indication of agreement with the sentiment of the content item is received from the first recipient and from a threshold number of additional recipients, the content item may then be broadcast, without identifying the sender, to one or more other participants. For example, the content item may be shared with the moderator of the communication session or with all participants in the communication session.

Additionally, control of the display of the sender's identity may change based on the number of additional recipients that agree with the sentiment of the content item. For example, if more than a threshold number of other participants indicate agreement with the sentiment of a content item, the identity of the sender may be displayed so that the content item is attributed to the sender. The sender can then publicly receive credit for his or her contribution.

The techniques presented in this disclosure can save computing resources, such as memory resources, processing resources, and networking resources. Other technical benefits beyond those mentioned specifically can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
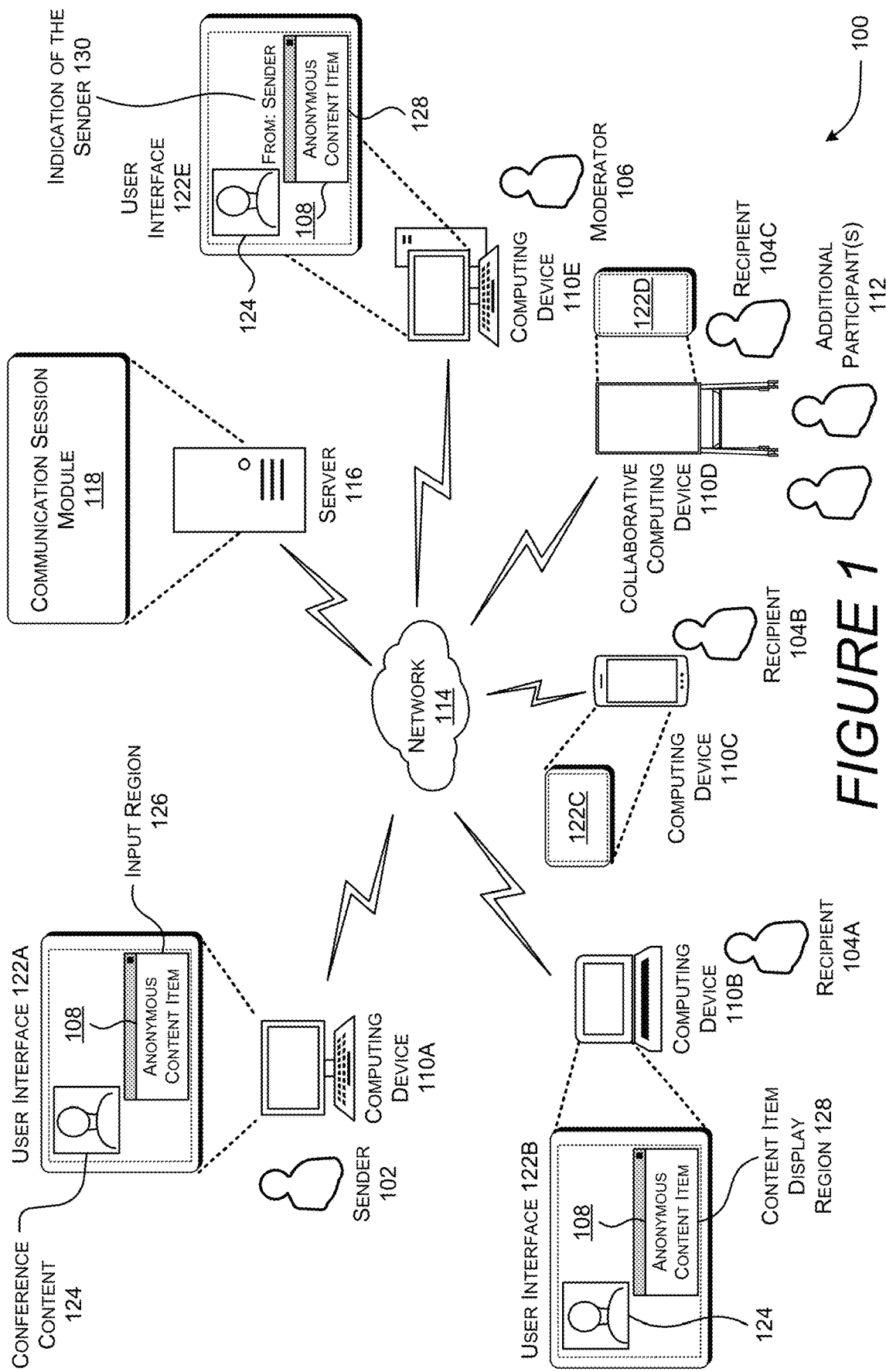
FIG. 1 illustrates an architecture for providing integrated UIs that include both attributed and anonymous content items.

This disclosure provides techniques for allowing users to control disclosure of their identities with respect to individual content items shared during a communication session. Systems described herein provide for integrating an anonymous content item and an attributed content item within a single application or single UI. As used herein, a communication session may include a video conference, a network conference, a telephonic conference, a collaborative real-time workspace, a webcast, a web meeting, a group chat, and the like. A content item may be any one of multiple different content types such as text messages, handwritten or "inked" writing on a touchscreen, icons (e.g., emoticons), video content, live stream, audio content, and the like.

As discussed briefly above, multiple different types of content items may be part of a communication session. Each of the multiple types of content items may also be distributed through the communication session in a way that is anonymous or in a way that identifies the user who created the content item. The communication session may have a main or primary type of content item such as a live video stream of the participants. This type of content item is not anonymous. For example, each of the participants in the communication session can be identified in the live video stream.

Attributed content items are content items that identify the sender or author of the content item to the recipients. The identity of the sender may be displayed together with the content item via identification in a user interface (UI). The UI may include, for example, an avatar or a username that identifies the user. In some configurations, the identity of the user who generated a content item is not directed displayed but is discoverable by the recipients (e.g., by clicking on the content item).

The exchange of anonymous content items can function as a secondary forum for communication that is available as part of the communication session. Anonymous content items may frequently be certain types of content items such as text messages, but of course, may take other forms. The anonymous content items are not part of the primary content item and are presented to the participants differently than the primary content item of the communication session.

Although communication sessions as described herein may frequently be conducted by participants at different locations communicating via a network, in some configurations, the communication session may include participants that meet in person. For example, there may be one or more conference rooms of people participating in a conventional meeting or conference. Each of the multiple conference rooms may be connected to the others by video conferencing or similar communication technology.

Participants who share the same physical location as other participants do not need a computing device to participate in the conference. However, due to the prevalence of laptop computers, tablets, and smartphones, participants who attend a meeting in person will likely also have access to their own computing device. Thus, each participant in a communication session, whether joining remotely or in person, will likely have access to an individual computing device. Therefore, even participants at in-person meetings can generate anonymous content items using the techniques and systems described below.

FIG. 1 is an architecture 100 for providing an integrated UI for attributed and anonymous content items. This architecture 100 shows an example communication session including a sender 102, multiple recipients 104A-104C, and a moderator 106. All of the sender 102, the recipients 104A-104C, and the moderator 106 are participants in the communication session. The sender 102 creates and sends an anonymous content item 108. The recipients 104A-104C receive the anonymous content item 108. In this illustrative architecture 100, the moderator 106 also receives the anonymous content item 108. "Moderator" as used in this disclosure includes roles and types of users such as host, meeting organizer, meeting owner, device owner, or the like. Stated differently, a moderator is a participant in the communication session who has a greater level of direct or indirect control over the behavior of software and/or hardware implementing the communication session than other participants.

Note that while three recipients 104A, 104B, and 104C are shown in FIG. 1, a communication session may include any number of recipients (e.g., two, five, 10, 100, etc.). The role of sender 102 and recipient 104 will also change with respect to individual content items depending on which participant sends the content item. The moderator 106 may also be a recipient of a content item and may also take the role of sender 102 for content items that he or she sends out. Also, the communication session may include one or more additional participants 112 that are recipients 104 of the anonymous content item 108.

The participants in the communication session access the communication session through their respective computing devices 110A-110E (referred to collectively as "computing devices 110" or individually as a "computing device 110"). The computing devices 110 are configured with an appropriate conferencing application. The computing devices 110A-110E may be any type of computing device such as, but not limited to, desktop computers, thin clients, laptop computers, tablets, smartphones, collaborative computing devices, and the like. The architecture 100 described here is not limited to use with any specific types of computing devices.

One or more of the computing devices 110 may be a collaborative computing device 110D such as a large-screen digital whiteboard that can be used by multiple people simultaneously. A digital whiteboard can present whiteboard objects such as, but not limited to, handwriting or handdrawn images such as digital ink created using a digital pen or touchscreen. In addition to the recipient 104C using the collaborative computing device 110D, the device may also be viewed by one or more additional participants 112. Thus, any content item displayed on the collaborative computing device 110D may be seen by more than one participant. Further, all of the participants sharing the collaborative computing device 110D will be able to see any content items written by the others on that device. Thus, anonymous content items 108 sent from a collaborative computing device 110D may not be anonymous with respect to the additional participants 112 using that device.

A network 114 provides a communicative connection between all of the computing devices 110. The network 114 may be implemented as any one or more types of communications networks such as the Internet, a Local Area Network (LAN), a Wide Area Network (WAN), a mesh network, a peer-to-peer network, etc. The network 114 may use both wired and wireless protocols for carrying data.

In some implementations, the network 114 may connect the computing devices 110 to a server 116. The server 116 may be a single computing device or multiple computing devices such as a rack of servers. In this disclosure, the server 116 may also represent a "cloud" resource that includes multiple discrete processing, storage, and networking resources which may be distributed across multiple physically separate locations.

The server 116 may provide resources to implement, manage, and maintain the communication session. For example, the server 116 may include a communication session module 118 that coordinates the flow of attributed and anonymous content items between various computing devices 110. The computing devices 110 of any one or more of the sender 102, the recipients 104, the moderator 106, and any additional participants 112 may join the communication session by connecting to the server 116. The communication session module 118 may include video codecs, audio filtering software, face and voice recognition ability, speech-to-text processing, text-to-speech processing, etc. The communication session module 118 may additionally include any other feature or functionality that is found in videoconference, online meeting, audio conference, or group chat software.

The communication session module 118 may alternatively be stored on one of the computing devices 110 such as, for example, the computing device 110E of the moderator 106. The communication session module 118 may also be stored in another network location (not shown in FIG. 1) or otherwise made available to the computing devices 110.

Although the network 114 connects the computing devices 110 participating in the communication session, one or more of the computing devices 110 and the respective participants (i.e., sender 102, recipients 104, moderator 106, and any additional participants 112) may be at the same location, such as the same conference room. Thus, some or all of the participants in the communication session may have the option of communicating with each other face-to-face. Videoconferencing or similar technology implemented by the communication session module 118 may share these in-person communications over the network 114 with remote participants at other locations.

The server 116, or other system anonymizes the anonymous content item 108 sent by the sender 102 by controlling when and where the identity of the sender is displayed. In an implementation, the server 116 may simply forward the content item to recipients 104 without including identification of the sender 102. For example, server 116 may provide textual content such as a text message or email to the recipients 104 with the "from" line or name of the sender blank, labeled "anonymous," or the like. Absent any indication of the identity of the sender, the computing devices 110 of the recipients 104 cannot identify the name or access another identifier of the sender 102.

In some implementations, the server 116 may remove indications of the sender 102 by additionally modifying the content item. For example, the server 116 may correct spelling or grammatical errors in an anonymous content item 108 to make it difficult to identify the sender 102 based on distinguishing characteristics of that individual's typical language use or misuse. The server 116 may, for example, automatically normalize English spellings to American-English, British-English, or another form of English language to prevent differences in spelling conventions from identifying a user. Also, the server 116 may automatically convert simplified Chinese characters to traditional, or traditional Chinese characters to simplified, to prevent variations in character set usage from identifying the sender 102.

In some implementations, even video and audio content may be shared as anonymous content items 108. The server 116 may anonymize these types of content by using image blurring or voice distortion techniques to disguise or otherwise obscure the identity of the sender 102. This allows for content items to be displayed without displaying an indication of the sender. Alternatively, the video or audio content may be converted to a different form. For example, the server 116 may change video content into a cartoon or line drawing in a way that omits individual physical features and simplifies the video content to make recognition of the sender's face or location more difficult. Audio content could be converted to text by speech recognition and speech-to-text technology. This prevents recipients 104 from hearing the sender's voice which could be one way of identifying the sender.

The computing device 110A of the sender 102 displays a UI 122A. The UI 122A includes conference content 124 which may be a video stream, an audio stream, a group chat, or another type of content. The conference content 124 is content that includes all or almost all of the participants in the communication session and identifies all of the participants. Thus, the conference content 124 is not anonymous.

The same UI 122A can also include an input region 126 for the sender 102 to input the anonymous content item 108. The input region 126 may be any type of UI element suitable for receiving input of a content item. Examples of the input region 126 include a text input box; a menu for selecting an emoticon, symbol, or preset message; a record button for recording a video or audio message; etc. The UI 122A may display the conference content 124 and the input region 126 simultaneously so that the sender 102 can easily generate the anonymous content item while participating in the communication session.

The computing devices 110B-110D of the recipients 104A-104C also have UIs 122B-122D. The UI 122B of the computing device 110B of a recipient 104A may include the conference content 124 and a content item display region 128 for presenting the anonymous content item 108. The content item display region 128 may be implemented as any suitable UI element for displaying the anonymous content item 108.

The particular type of UI element will vary based on the type of content item content. Text messages may be displayed in a text box or chat stream. Video messages may be displayed in a video window. Audio messages may be activated by a play button or similar UI element. Playback of audio from a video or audio content item may be directed to a single speaker channel (e.g., right or left) while any audio from the conference content is directed to a different speaker channel. This allows the recipient 104A to direct his or her attention to the speaker channel of the anonymous content item 108 rather than listen to an audio channel that combines audio of the anonymous content item 108 with audio from the conference content 124.

The content item display region 128 in this UI 122B does not include an indication of the sender 102. As described above, the server 116 may control display of the identification of the sender 102 such that the anonymous content item 108 is displayed by the computing device 110B but identification of the sender 102 is not displayed. The UI 122B may integrate the display of the conference content 124 and content item display region 128 in a single window or other UI element.

The computing device 110E of the moderator 106 may display a different UI 122E than the computing devices 110B-110D of the recipients 104A-104C. One difference is that the UI 122E available to the moderator 106 may display an indication of the sender 130. Thus, in an implementation, the anonymous content item 108 may not be anonymous for the moderator 106. This limitation on anonymity is disclosed to the sender 102 prior to sending of the anonymous content item 108, when the sender joins the communication session, or at both times.

Selective anonymization may be implemented by the server 116. The server 116 may maintain the indication 130 of the sender 102 associated with the content item when sending the anonymous content item 108 to the UI 122E of the computing device 110E used by the moderator 106. However, in other implementations, the UI 122E for the moderator 106 may appear the same as with the UIs 122B-122D of the recipients and also lack an indication of the sender. Thus, in some implementations, the anonymous content item 108 may be anonymous for all participants in the communication session, including the moderator 106.

The UIs 122C and 122D of computing devices 110C and 110D are the same or similar to the UI 122B of the computing device 110B but are shown in FIG. 1 in simplified form. All of the UIs 122A-122E (individually UI 122 and collectively UIs 122) may be sent or provided by the server 116. The server 116 may send bitmaps or otherwise provide the UIs 122 substantially complete to the computing devices 110. Alternatively, the server 116 may send instructions or commands (and content data) to software or hardware on the computing devices 110 that causes the computing devices 110 to present the UIs. The way in which the server 116 provides a UI may be different for different computing devices 110 based on the capability of the computing device 110, the network connection, user settings, and other factors.

Figure 2:
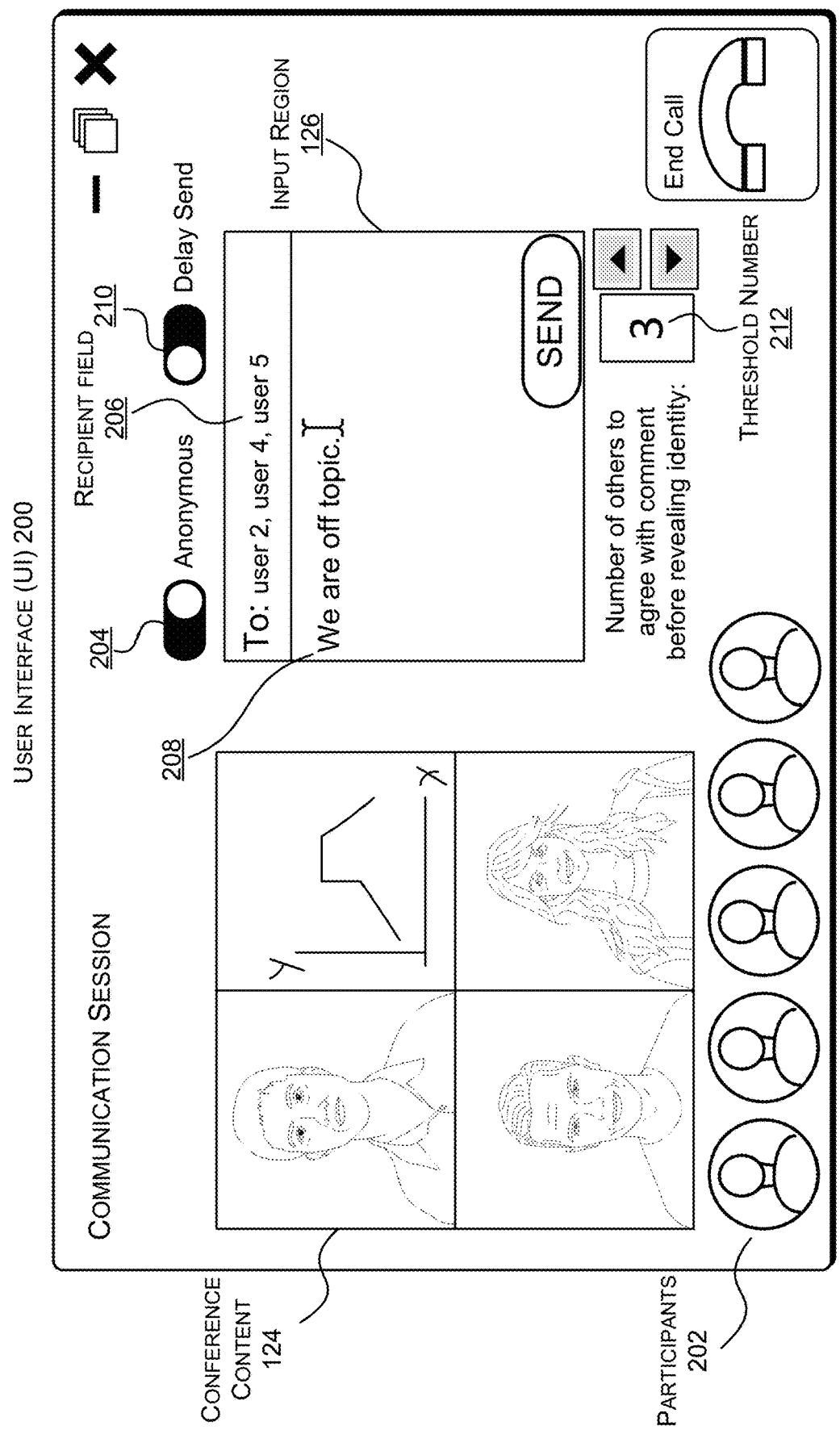
FIG. 2 is an illustrative UI for sending anonymous content items during a communication session.

FIG. 2 shows an illustrative UI 200 for sending anonymous content items 108 during a communication session. This UI 200 is an example of the UI 122A provided on the computing device 110A of the sender 102 in FIG. 1. The UI 200 includes the conference content 124 and may display a list of participants 202 in the communication session. The UI 200 also includes an input region 126 for providing anonymous comments during the communication session. The input region 126 is shown as a text input box in this example but may take other forms.

In this example, the input region 126 may be used to send both attributed and anonymous content items. A first UI element 204 is illustrated here as a toggle that is used to designate a content item as anonymous or not. The anonymous setting may prevent display of the identity of the sender 102 (not shown in FIG. 2) to any of the other participants 202 in the communication session. If the content item is not designated as anonymous by the sender 102, the content item will by default be attributed to the sender 102. The attribution is provided by displaying or otherwise sending an identifier of the sender 102 together with the content item.

The input region 126 may also be associated with a recipient field 206 or another UI element to indicate or select recipients 104 for the content item. Thus, the sender 102 may be able to select the recipients 104 for his or her anonymous content item 108 rather than sharing the content item with all participants 202. The sender 102 may designate the recipients 104 by entering usernames or email addresses in the recipient field 206, "clicking" on representations of the participants 202, "dragging" an icon representing a participant 202 to the recipient field 206, or via another technique.

The choices for recipients 104 may be restricted to current participants 202 in the communication session. Thus, the sender 102 may be unable to use the input region 126 to send anonymous content items to people not currently participating in the communication session. If the sender 102 does not indicate any recipients 104, then a default setting may send the content item to all participants 202. In an implementation, the sender 102 may be unable to select specific recipients 104 and in that instance all anonymous content items 108 must be shared with all participants 202. In a different implementation, all anonymous content items 108 are sent only to the moderator 106.

In an implementation, activating the first UI element 204 to make the content item anonymous may cause the recipient field 206 to become inactive or locked. This may also set the recipient(s) 104 to a default such as all participants 202 or only the moderator 106. This may be indicated, for example, by the words "All Participants" or "Moderator" being displayed in the recipient field 206. In other implementations, the recipient field 206 may be omitted for anonymous content items. In such implementations, users of the UI 200 may understand that the anonymous content item will be sent to a default set of recipients.

The sender 102 enters the content 208 of a content item, such as the actual text of the message, within the input region 126. The content 208 in this example is the text "We are off topic." The content 208 is not limited to text but may be a symbol, an emoticon, a hand-drawn marking, an image, a Graphics Interchange Format (GIF) bitmap image, or another type of content.

Anonymity may be compromised if one user is seen and heard typing on his or her computing device 110 and then an anonymous content item 108 subsequently appears to other participants 202 in the same room. To prevent anonymity from being compromised in this way, it is possible to delay the sending of the anonymous content item 108. Sending of the anonymous content item 108 may be delayed if the sender 102 activates a second UI element 210 that specifies delayed sending. The second UI element 210 is also shown as a toggle in this example.

The amount of time delay may be a fixed amount of time (e.g., 5 s, 10 s, 30 s) or it could be a random amount of time within a range (e.g., 10-45 s). In some implementations, the sender 102 may designate the amount of time delay. The time delay may be implemented by the computing device 110 delaying its transfer of the anonymous content item 108 to the server 116 or by the server 116 retaining the anonymous content item 108 for the length of the time delay before sending it on to the recipients 104. In some implementations, a time delay may be provided automatically by default if the UI 200 lacks the second UI element 210.

The UI 200 may also provide a UI element for the sender 102 to indicate a threshold number 212 of recipients 104 who must indicate agreement with a sentiment contained in the content 208 before the sender 102 consents to disclosing his or her identity. "Threshold number" as used in this disclosure also contemplates a threshold percentage or ratio, although not shown in FIG. 2.

For example, the threshold number 212 may be a percentage of the recipients 104 of the anonymous content item 108 or a ratio of the participants 202 indicating agreement relative to a total number of participants 202. As discussed in greater detail below, the recipients 104 of an anonymous content item 108 may be able to indicate agreement with the sentiment of the anonymous content item 108. If the sentiment in an anonymous content item 108 is shared by multiple other participants, the sender 102 may no longer wish to remain anonymous but may desire attribution to take credit for the content item.

Setting a threshold number 212 (e.g., 3, 5, 10) of recipients 104 who must indicate agreement with the sentiment of the anonymous content item 108 before triggering the change from anonymous to public allows the sender 102 to control when his or her identity is revealed to others. For example, the sender 102 may be comfortable having a non-controversial content item, such as a technical issue, being attributed to him or her when just a few other participants 202 have the same technical issue. However, the sender 102 may wish to keep a potentially more controversial content item anonymous unless a large number of the participants 202 also indicate agreement with that sentiment.

Figure 3:
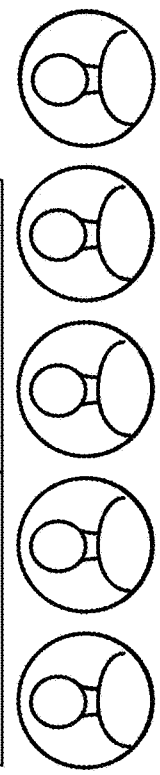
FIG. 3 is an illustrative UI for sending anonymous content items that include in the UI a selectable set of predetermined categories for labeling a content item as being anonymous.
Figure 3:
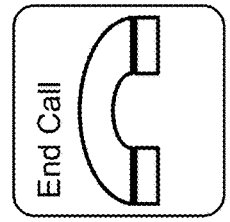

FIG. 3 shows an illustrative UI 300 for sending anonymous content items 108 that includes a selectable set of predetermined categories 302 used to label an anonymous content item 108. This UI 300 is an example of the UI 122A provided on the computing device 110A of the sender 102. This example UI 300 shows one way that the sender 102 can classify his or her anonymous content item 108 into one of several predetermined categories 302. The classification may be indicated by interaction with a UI element such as a set of checkboxes.

The predetermined categories 302 can be used to assign default settings for how the anonymous content item is to be sent and/or to determine recipients for the content item. Also, the predetermined categories 302 may serve to categorize the anonymous content items 108 received during the communication session for purposes of a post-conference summary. FIG. 3 shows a set of checkboxes that allow the sender 102 of an anonymous content item 108 to select between, for example, categories of technical issue, question, complaint, or compliment. Of course, these categories are only representative and not intended as limiting, and any other categories may be used including a greater or lesser number of categories.

In an implementation, selection of one of the predetermined categories 302 may be required before the anonymous content item 108 can be sent. In other implementations, the selection of a predetermined category 302 is optional. All of the anonymous content items 108 labeled with the same category may be placed within the same category or group to be reviewed by the moderator 106, an administrator, or another individual prior to delivery.

The anonymous content items 108 may also be saved and available after the communication session has ended. The saved anonymous content items 108 may be reviewed by a participant or by someone who was not a participant such as a supervisor, human-resources professional, business owner, or technical support worker. The anonymous content items 108 may be presented for review as individual content items. Alternatively, characteristics or features of the content items may be presented or in aggregate such as in a post-conference summary. Grouping by the predetermined categories 302 may be used to aggregate anonymous content items 108 of the same category and generate the post-conference summary. The post-conference summary may also indicate the number of anonymous content items 108 in each of the predetermined categories 302.

For example, anonymous content items 108 labeled with the category "technical issue" may be sent to a designated technical support person to be addressed prior to future conferences. This may be the moderator 106 or another individual such as an information technology (IT) worker. Similarly, if the "complaint" category is attached to an anonymous content item 108, that content item may be sent only to the moderator 106. Other mappings between the predetermined categories 302 and specific recipients are also possible.

Figure 4:
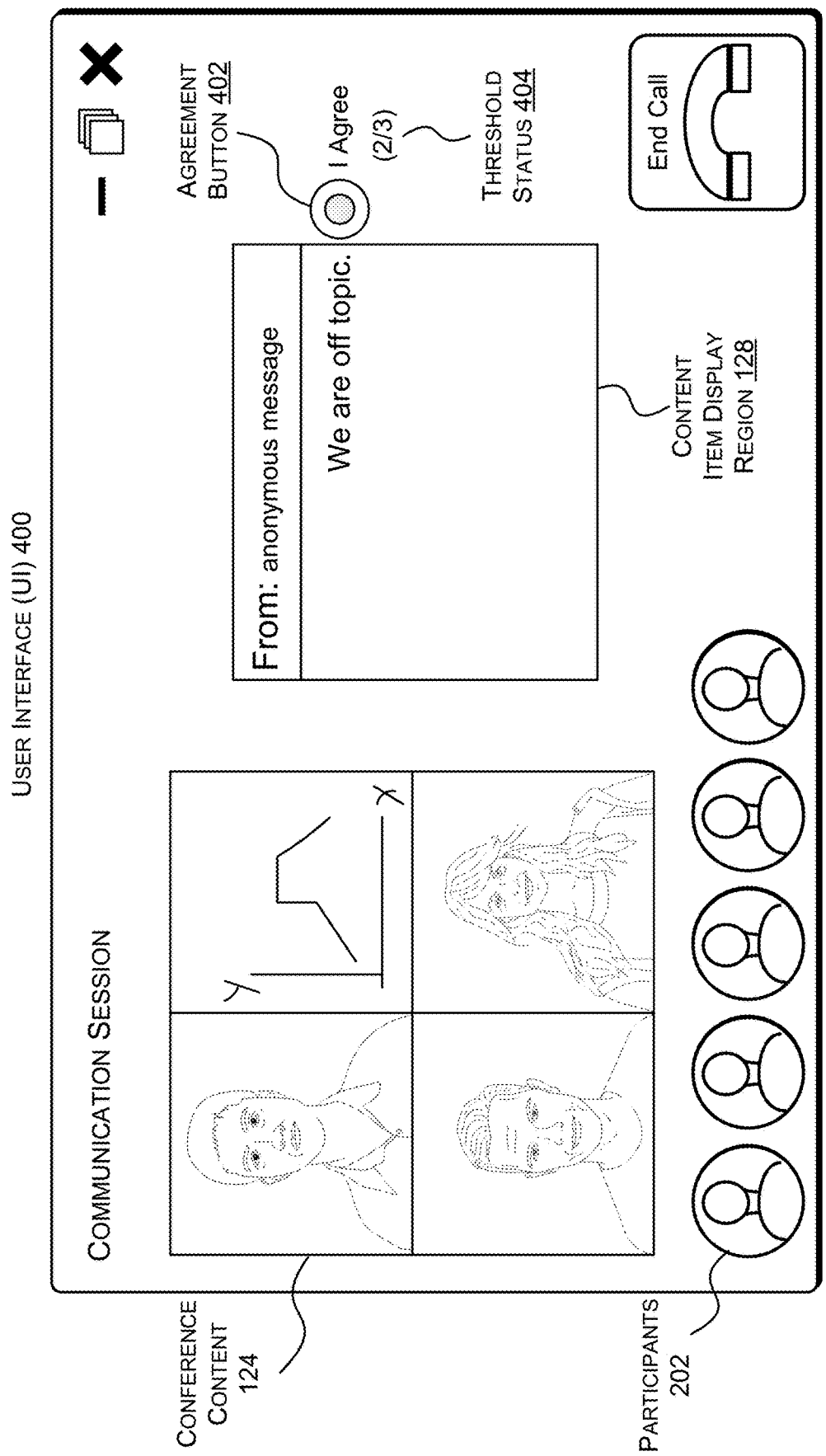
FIG. 4 is an illustrative UI for viewing an anonymous content item and indicating agreement with the sentiment of an anonymous content item.

FIG. 4 shows an illustrative UI 400 for viewing an anonymous content item 108 and indicating agreement with the sentiment of the anonymous content item 108. This UI 400 is an example of the UI 122B provided on the computing device 110B of the recipient 104A or of any recipient 104. The "sentiment" of an anonymous content item 108 is the meaning, intent, perspective, factual statement, or opinion conveyed by the anonymous content item 108 as perceived by the recipient 104. Sentiment in this usage is not computer analysis of linguistic meaning but is the subjective, human interpretation of the content item.

The UI 400 includes an agreement button 402, or other type of UI element, that the recipient 104 may use to indicate agreement with the sentiment of the content item. Each recipient 104 of an anonymous content item 108 may be presented with a UI 400 that includes an agreement button 402. Clicking the agreement button 402 can be interpreted as "seconding" or "voting up" the anonymous content item 108. The number of recipients 104 that activate the agreement button 402 may be used as a measure of consensus with the sentiment expressed in the anonymous content item 108 among the participants 202.

In some configurations, a threshold status 404 may be displayed in the general area of the agreement button 402. The threshold status 404 may indicate if the threshold number 212 has been met. In this example, the threshold status 404 shows the number of participants 202 who have indicated agreement with the sentiment of the anonymous message (e.g., two) and the threshold number 212 (e.g., three). Thus, if two more participants 202 agree with the sentiment "We are off topic" the identity of the sender will be revealed. The identity of those who indicate agreement may also be revealed. The threshold status 404 is not limited to displaying a fraction but may simply indicate if the threshold is met or not, indicate a number of additional "up votes" to reach the threshold (without indicating a total), or the like.

This technique of confirming agreement with another's content item may be particularly useful to identify common perspectives in communication sessions with a large number of participants. It may also allow a moderator 106 to focus his or her attention on those anonymous content items 108 that are relevant to the largest number of participants 202.

An anonymous content item 108 may be upvoted if multiple users agree with the sentiment of the content item. Content items that are upvoted may be shared with the moderator 106, all participants 202, or otherwise be prominently displayed in a UI.

Figure 5:
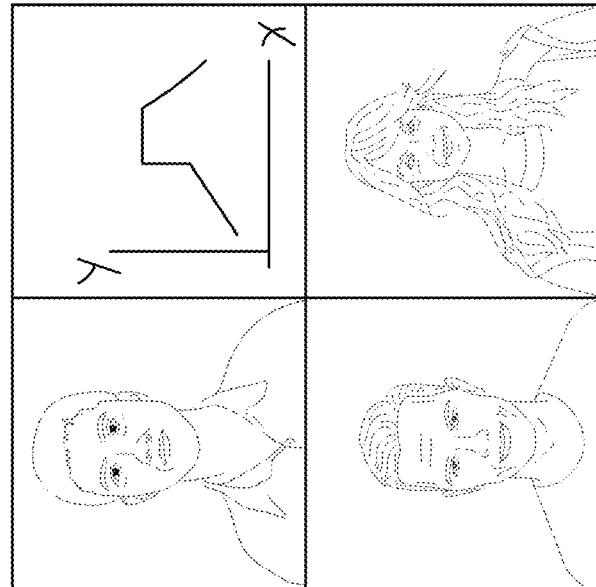
FIG. 5 is an illustrative UI for displaying a group comment that represents the sentiment of multiple participants in a communication session.

FIG. 5 shows an illustrative UI 500 for displaying an anonymous content item 108 that others have indicated agreement with as shown in FIG. 4. The anonymous content item 108 may be presented as a group comment indicating the sentiment of multiple participants 202 in the communication session. The group comment may be presented in a group comment display region 502 which can be different than a content item display region 128. The group comment display region 502 may be more prominent than the content item display region 128.

The group comment may be presented in the UI 500 on the computing device 110 of a participant 202, including the moderator 106 (not shown in FIG. 5), who has not previously received the content item content. Thus, if more than the threshold number of people (e.g., more than three people) indicate agreement with the sentiment of the anonymous content item 108, the content item may be shared with a wider audience. For example, the threshold number may be a default number determined by the communication session module 118 or a number set by the moderator 106.

Requiring a threshold number of recipients 104 to indicate agreement with the sentiment of the anonymous content item 108 before the anonymous content item 108 is shown to other users, furthers the dissemination of comments that represent widely held views. Off-topic or irrelevant comments are unlikely to be "voted up" and shared beyond the original set of recipients 104. Thus, group comments may be viewed as having greater value or being more useful to a larger number of the communication session participants 202 than other anonymous content items 108.

The communication session module 118 may keep track of the number of recipients 104 to indicate agreement with the sentiment of the anonymous content item 108 and compare this number to the threshold number. Once it exceeds the threshold number, the communication session module 118 may send the anonymous content item 108 to people other than the original set of recipients 104. For example, the anonymous content item 108 may be sent to all of the participants 202 in the communication session. Alternatively, the anonymous content item 108 may be sent only to the moderator 106. The threshold number of indications of agreement may be based on a predetermined category 302 with which the anonymous content item 108 is labeled (e.g., a threshold of two for technical issues, a threshold of 10 for complaints).

In an implementation, the group comment display region 502 may also display a number of participants 504 that agree with the sentiment of the anonymous content item 108. This number includes the sender 102 and any of the recipients 104 who indicated agreement with the sentiment for example by clicking an agreement button 402 as shown in FIG. 4. Presenting the number of participants 504 that have indicated agreement with the sentiment of the content item allows a viewer of the UI 500 to easily gauge the popularity of the content item. This number may be an integer showing the total number of people, a ratio, or a percentage indicating what portion of the total number of participants 202 agree with the sentiment conveyed by the content of the content item.

In an implementation, identities of the participants 506 who agree with the sentiment of the content item may be shown in the group comment display region 502. Specifically, the identities of all the participants may be displayed only if a number equaling or exceeding the predetermined threshold indicating agreement with the sentiment has been met. The threshold number for revealing the identities of the sender 102 and the recipients 104 who share that sentiment may be different, possibly higher, than the threshold number for presenting the anonymous content item 108 in the group comment display region 502. When it is known that many participants 202 share the same sentiment, it may be less threatening and more comfortable to have one's identity associated with that sentiment or content item. It also allows those participants 202 who agreed with the sentiment of the anonymous content item 108 to receive public recognition for their position.

Both the sender 102 and each of the recipients 104 who indicate agreement with the sentiment of the content item may be asked to affirmatively permit sharing of their identities with the moderator 106 or other specific individuals if the threshold number is met. This request to authorize display of identities may be provided to the recipients 104 and the sender 102 contemporaneously with the comment and subsequent indications of agreement or after the threshold number has been reached. For example, the server 116 may generate a dialog box or query stating: "Eighty-five people now agree with the sentiment in this content item. Would you like your name associated with this content item?" Both the sender 102 and each of the recipients 104 may make an individual decision regarding disclosure of their identities in association with the content item.

In some implementations, each individual may specify how many others must indicate agreement with the sentiment of the content item before his or her identity will be revealed. For example, the sender 102 may be comfortable having his or her identity shared if two other people also agree with the sentiment of the anonymous content item 108. However, a recipient 104 of the anonymous content item 108 may only be comfortable being associated with that sentiment if more than half of the participants 202 in the communication session agree.

The identities of the participants 506 may be displayed in the group comment display region 502 without indicating which participant 202 was the sender 102 of the anonymous content item 108. Thus, the identity of the sender 102 and of those recipients 104 who agree with the sentiment of the content item content may be shown in an undifferentiated manner. However, it is also contemplated that the sender 102 may be identified as the sender in the group comment display region 502.

Figure 6:
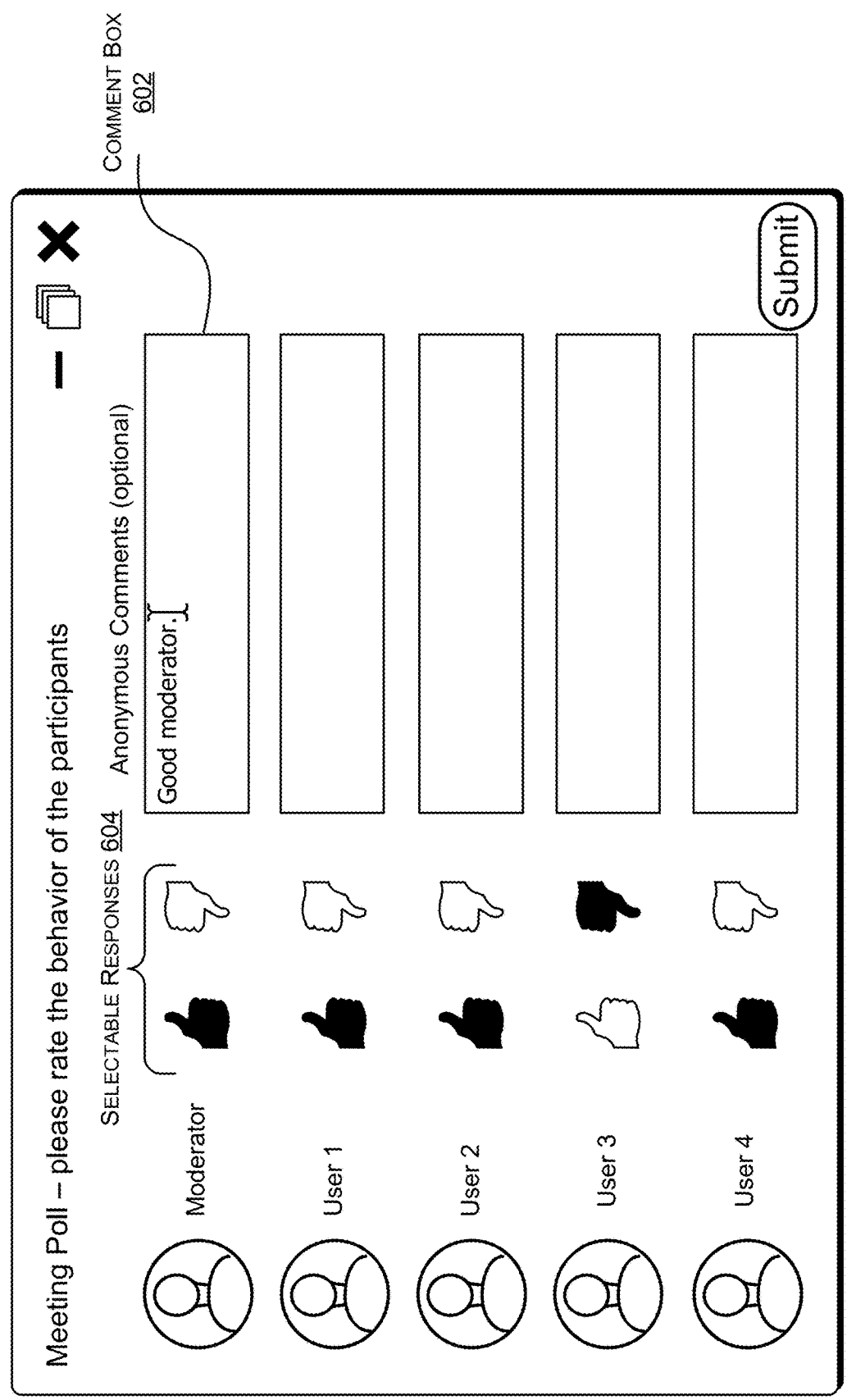
FIG. 6 is an illustrative UI for providing anonymous comments in response to a poll.

FIG. 6 shows an illustrative UI 600 for providing anonymous comments and feedback in response to a poll. The poll may be about any topic or subject, and the illustration is not to be construed as being limited. In this example UI 600, the poll includes comment boxes 602. The comment boxes 602 are fields for unstructured entry of textual comments. This example poll also includes one or more selectable responses 604 from which a user can choose one of multiple predetermined icons or responses. The comments entered into the comment boxes 602, such as in this example the text "Good moderator," and the selection of one or more of the selectable responses 604 are further examples of content. Comments and responses entered in the UI 600 may be anonymous by default. However, a user answering the poll may choose to allow a viewer of the poll results, such as a moderator 106, to view his or her identity.

The UI 600 containing the poll may be presented to the participants 202 during the communication session (e.g., during a break) or after the communication session has ended. For example, the poll may be presented to the participants 202 on their respective computing devices 110 immediately after the communication session concludes. Polls may be presented multiple times during and/or after a communication session. The poll may be provided to all participants 202, to everyone other than the moderator 106, or to some other subset of the participants 202. For example, the poll may be provided to those participants 202 that did not generate any comments or questions (attributed or anonymous) during the communication session.

In this example UI 600, the poll solicits anonymous feedback and comments about the behavior of the moderator and other participants 202 during the communication session. The selectable responses 604 include a thumbs-up symbol and a thumbs down symbol for the moderator and each participant 202. A user responding to the poll can select the thumbs-up symbol to indicate good behavior or the thumbs down symbol to indicate bad behavior. The selectable responses 604 are used to provide an indication of the sentiment regarding the behavior of the moderator and other participants 202. The selectable responses 604 may also be implemented differently such as with a smiley face icon, a neutral face icon, and a frowny face icon. The poll may also include a greater number of options for the selectable responses 604 and the selectable responses 604 may include text or other elements than icons.

Responses to the poll entered in the UI 600 may be collected by the server 116. The server 116 may anonymize the comments provided through the comment box 602 and the selections of the selectable responses 604 by controlling display of the identity of the participants 202 who responded to the poll. One way of preventing inadvertent disclosure of identities is by removing any association or link with the computing device 110, such as a network identifier or internet protocol address, from which the poll responses were received.

The server 116 may, such as through the communication session module 118, aggregate all the anonymous responses and comments to the poll and generate a summary. For the example poll shown in UI 600, the summary may identify each participant 202, report the percentage of thumbs up/thumbs down ratings, and list any anonymous comments by that individual. This report may be sent to the moderator 106 at the end of the communication session.

Figure 7:
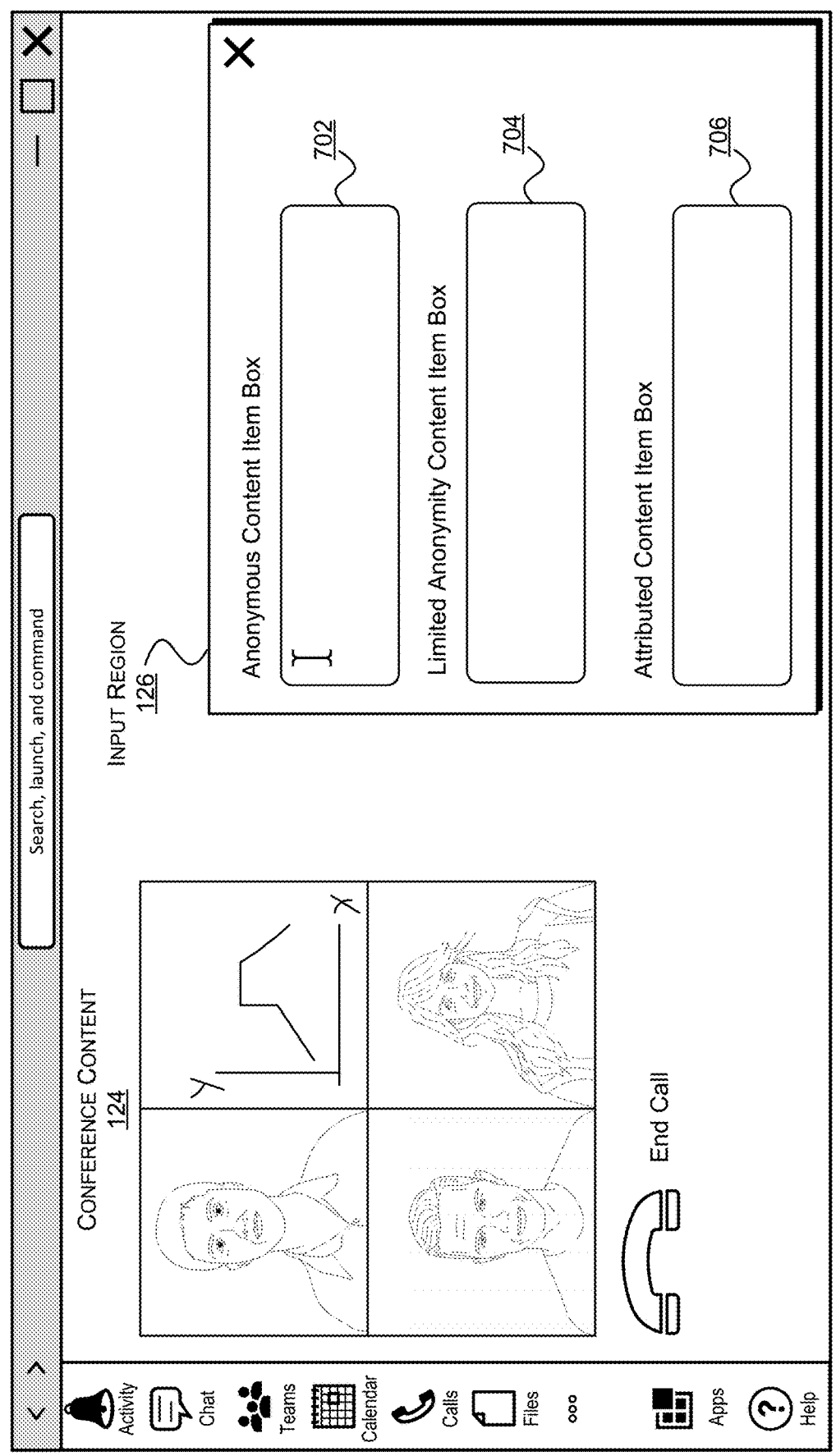
FIG. 7 is an illustrative UI for providing content items with different levels of anonymity.

FIG. 7 shows an illustrative UI 700 for providing content items with different levels of anonymity. The UI 700 is representative of an example UI of a collaboration application. A collaboration application is a software application that may hold a variety of content for multiple users to interact with simultaneously and/or sequentially. The collaboration application may include functionality such as a chat function, live video streams, live audio streams, and file sharing. Examples of collaboration applications include MICROSOFT TEAMS, SLACK, GOOGLE HANGOUTS, and FACEBOOK WORKPLACE. The collaboration application may be any type of application and is not limited to applications with specific types of functionality (e.g., video streaming, audio streaming, etc.).

The UI 700 includes a UI element that presents the conference content 124. For example, the conference content 124 may be presented in a video window. While simultaneously displaying the conference content 124, the UI 700 may also present an input region 126. The input region 126 may be presented as a pop-up window or another type of UI element.

The input region 126 may include multiple text input boxes 702-706, or other UI elements, for entering content items having differing levels of anonymity. An anonymous content item box 702 provides a field for entering content items that are to be kept anonymous from all other participants 202. Content items entered in the anonymous content item box 702 may be thought of as completely anonymous content items.

However, in some implementations, the sender 102 of content items entered in the anonymous content item box 702 may be identifiable by a network administrator or other technical support person. Also, senior individuals in an organization such as the president or owner may have the ability to obtain the identity of the sender 102 from the network conferencing system. Any limits on anonymity may be disclosed to the sender 102 prior to the sender sending the content item, prior to joining the communication session, or both.

Content items entered in the limited anonymity content item box 704 provide anonymity to the sender 102 for some but not all recipients 104. For example, a "limited anonymity" content item may have the sender's identity disclosed to the moderator 106 and have anonymity maintained for other recipients 104. In other implementations, the limited anonymity content item box 704 may show the sender's identity to individuals other than, or in addition to, the moderator 106 such as a network administrator or a supervisor.

The attributed content item box 706 is a field for the sender 102 to enter content items that will be attributed to the sender 102. Thus, all recipients of the content item content entered in the attributed content item box 706 will be able to identify the sender of the content item.

Providing an input region 126 on the UI 700 (or on any other UI) that includes multiple input regions for entering content items with different levels of anonymity makes it easy for a sender 102 to choose a level of anonymity to associate with a content item. Use of separate input boxes for separate levels of anonymity prevents confusion about how a content item will be processed because the location of input on the 700 UI corresponds to a specific level of anonymity.

Figure 8:
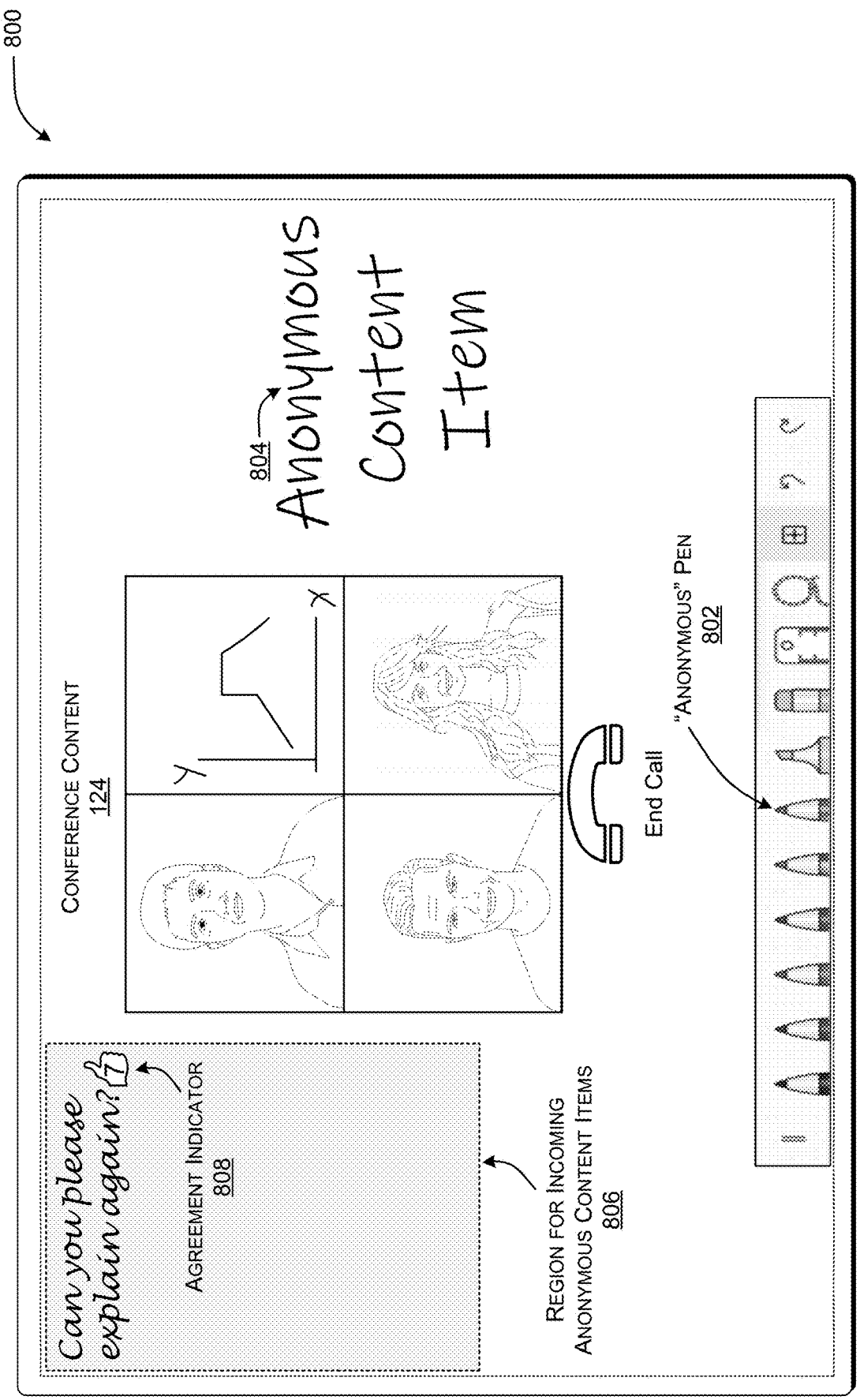
FIG. 8 is an illustrative touch-screen UI for creating an anonymous content item with an "anonymous" pen and for viewing incoming anonymous content items.

FIG. 8 is an illustrative touch-screen UI 800 for creating anonymous content items with an "anonymous" pen 802 and for viewing incoming anonymous content items. This and other touchscreens discussed in this disclosure may be any type of touchscreen such as resistive, surface capacitive, projected capacitive, SAW (Surface Acoustic Wave), optical imaging, acoustic pulse recognition, infrared, or the like. The UI 800 may be the touchscreen of a collaborative computing device such as a digital whiteboard.

The UI 800 may include the conference content 124 displayed alongside white space or input areas for content items. The UI 800 can include a toolbar that provides multiple tools for interacting with the touchscreen such as drawing tools that correspond to pencils, pens, highlighters, erasers, etc. One of these tools may be the anonymous pen 802. Anything written on the touchscreen with the anonymous pen 802 is shared with others as an anonymous content item 804. The anonymous pen 802 may be a "soft" pen or brush that is selected as a drawing or writing tool from a toolbar or menu. A user may then contact the touchscreen with his or her finger, a stylus, a mouse, or another pointing tool to use the anonymous pen 802. Alternatively, the anonymous pen 802 may be a physical stylus or other tangible pointing tool that is recognized by the UI 800 as an anonymous pen 802.

The UI 800 may implement the anonymous pen 802 as if it were any other pen or brush tool and assign anonymity as a "color" or formatting option for this pen. Thus, words, drawings, symbols, etc. created with the anonymous pen 802 anywhere on the surface of the touchscreen are shared as anonymous content items. Anonymous content items written with the anonymous pen 802 may be shared in the same way as anonymous content items generated by any other type of input such as typing into a text box. Thus, in this example the choice of user input device itself provides the indication of anonymity.

The UI 800 may also include a region for displaying incoming anonymous content items 806. This may be a predetermined region on the UI 800 which is designated for displaying anonymous content items coming from other participants 202 in the communication session. Writing or marking that appears in this region for incoming anonymous content items 806 of the UI 800 is not identified as being associated with a sender 102. The region for incoming anonymous content items 806 may be shaded, colored, bordered, or otherwise made visually distinctive on the UI 800. An anonymous content item displayed in the region for incoming anonymous content items 806 may be associated with an agreement indicator 808. The agreement indicator 808 shows the extent to which other participants 202 have indicated agreement with the sentiment of the anonymous content item. This may be shown as a total number of participants 202 who have indicated agreement, a fraction showing the number of participants 202 who have agreed relative to a threshold number, or as another type of representation.

Figure 9:
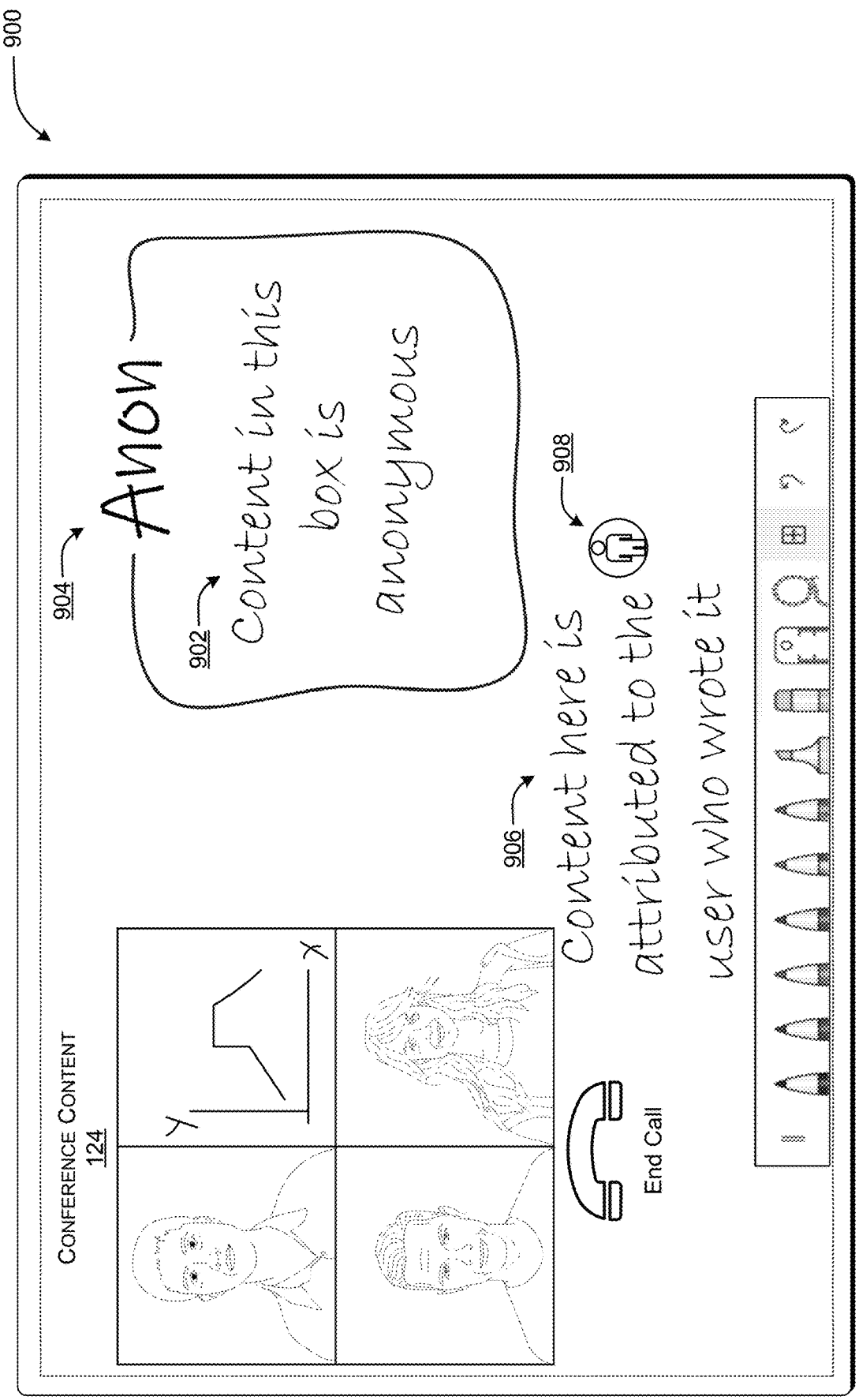
FIG. 9 is an illustrative touch-screen UI for creating an anonymous content item and for indicating that a content item is anonymous with a hand-written marking.

FIG. 9 is an illustrative touch-screen UI 900 for creating anonymous content item content 902 and indicating anonymity with a predetermined anonymous symbol 904. The predetermined symbol 904 may be a word, words, single character, or arbitrary symbol that is handwritten on the UI 900. In this example UI 900, the predetermined symbol 904 is the word "anon" which is short for anonymous. Other markings may also be used such as the letters "AF" to represent anonymous feedback, the letter A surrounded by a circle, or another predetermined symbol.

Anonymous content item content 902 may be designated as such by placing it within a hand-drawn box that includes the predetermined symbol 904. Alternatively, the anonymous content item 902 may be designated as an anonymous content item by placement in proximity to the predetermined symbol 904. For example, any text or drawing content within a specified radius of the predetermined symbol 904 may be interpreted as an anonymous comment.

The UI 900 may also display an attributed content item 906. The attributed content item 906 is associated with a sender 102, such as, for example by displaying an avatar or another identifier 908 of the sender 102 next to the attributed content item 906. By default, any marking or inking provided on the UI 900 without the predetermined symbol 904 may be attributed to the user. Thus, use of the predetermined symbol 904 allows the sender 102 to differentiate anonymous content items 902 from attributed content items 906.

Figure 10:
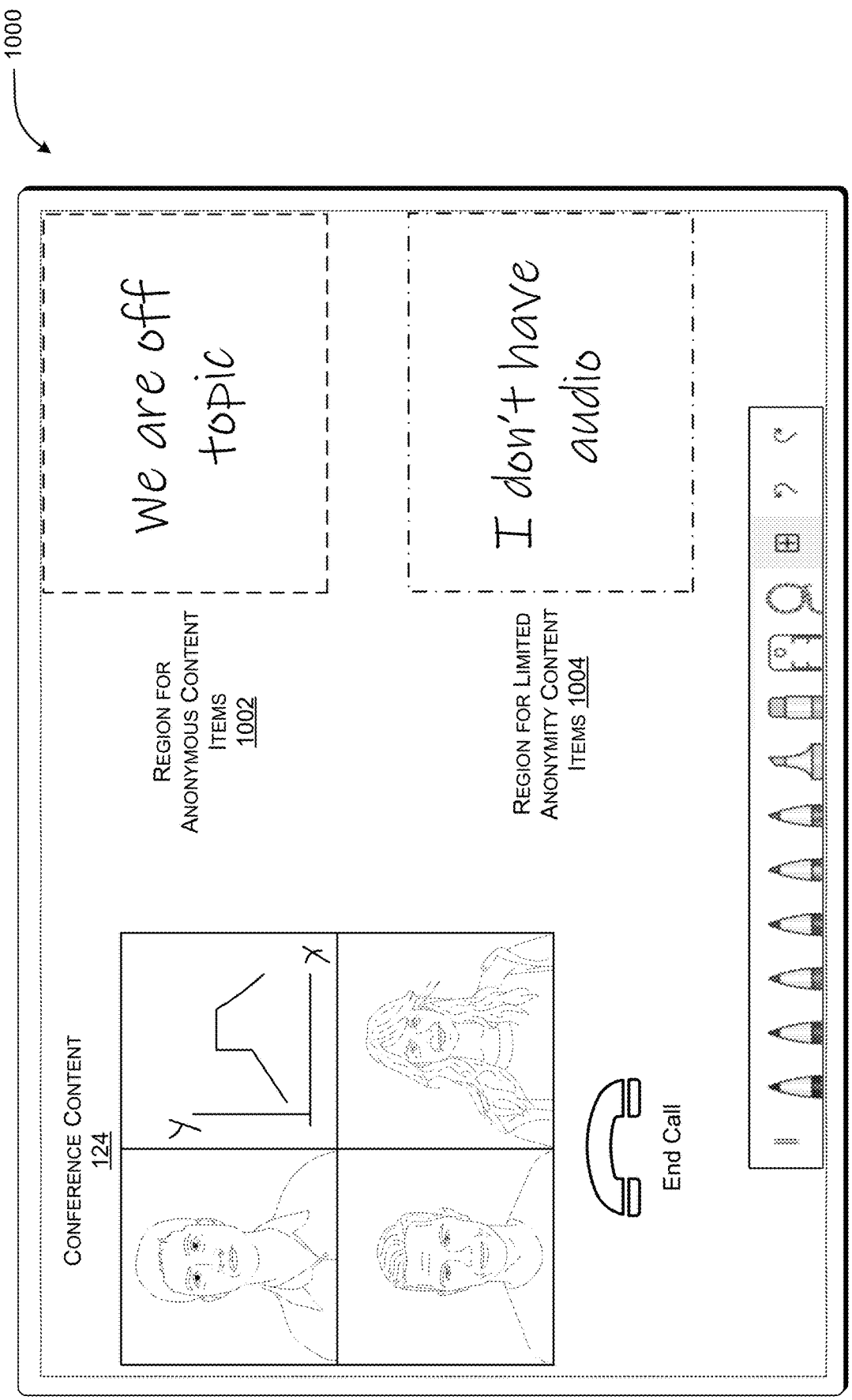
FIG. 10 is an illustrative touch-screen UI showing a first region for writing anonymous content items and a second region for writing limited anonymity content items.

FIG. 10 is an illustrative touch-screen UI 1000 showing a first region for anonymous content items 1002 and a second region for limited anonymity content items 1004. Different regions of the UI 1000 are associated with different levels of anonymity. Thus, the location on the surface of the touch-screen correlates with a level of anonymity. Content items written in the first region for anonymous content items 1002 will be presented to other participants 202 without identification of the sender 102. Content items written in the second region for limited anonymity content items 1004 will be presented as anonymous content items to some recipients and will identify the sender for other recipients such as the moderator 106, IT support personnel, etc.

In this example UI 1000, the first region for anonymous content items 1002 is shown in the upper right corner of the touchscreen and the second region for limited anonymity content items 1004 is shown in the lower right corner of the touchscreen. However, the predetermined regions of the touchscreen used for indicating the anonymity level of a content item may be located anywhere on the touchscreen. By creating two spatially separate regions of the touchscreen for entering content items with different levels of anonymity, users can easily see how a content item will be processed and avoid mistakenly disclosing their identities when the intent is to remain anonymous.

Figure 11:
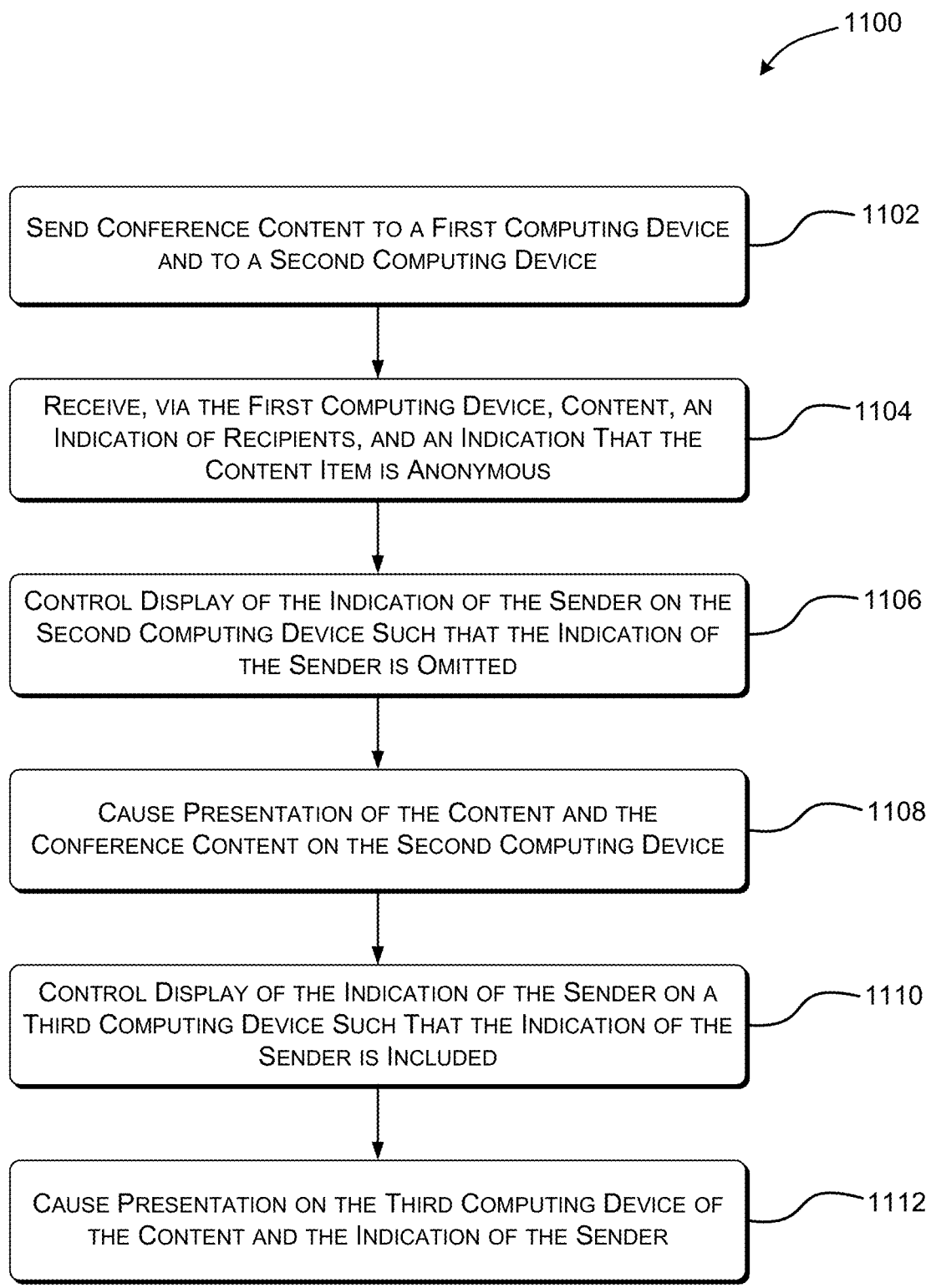
FIG. 11 is a flow diagram showing aspects of a process for disseminating anonymous content items during a communication session.
Figure 12:
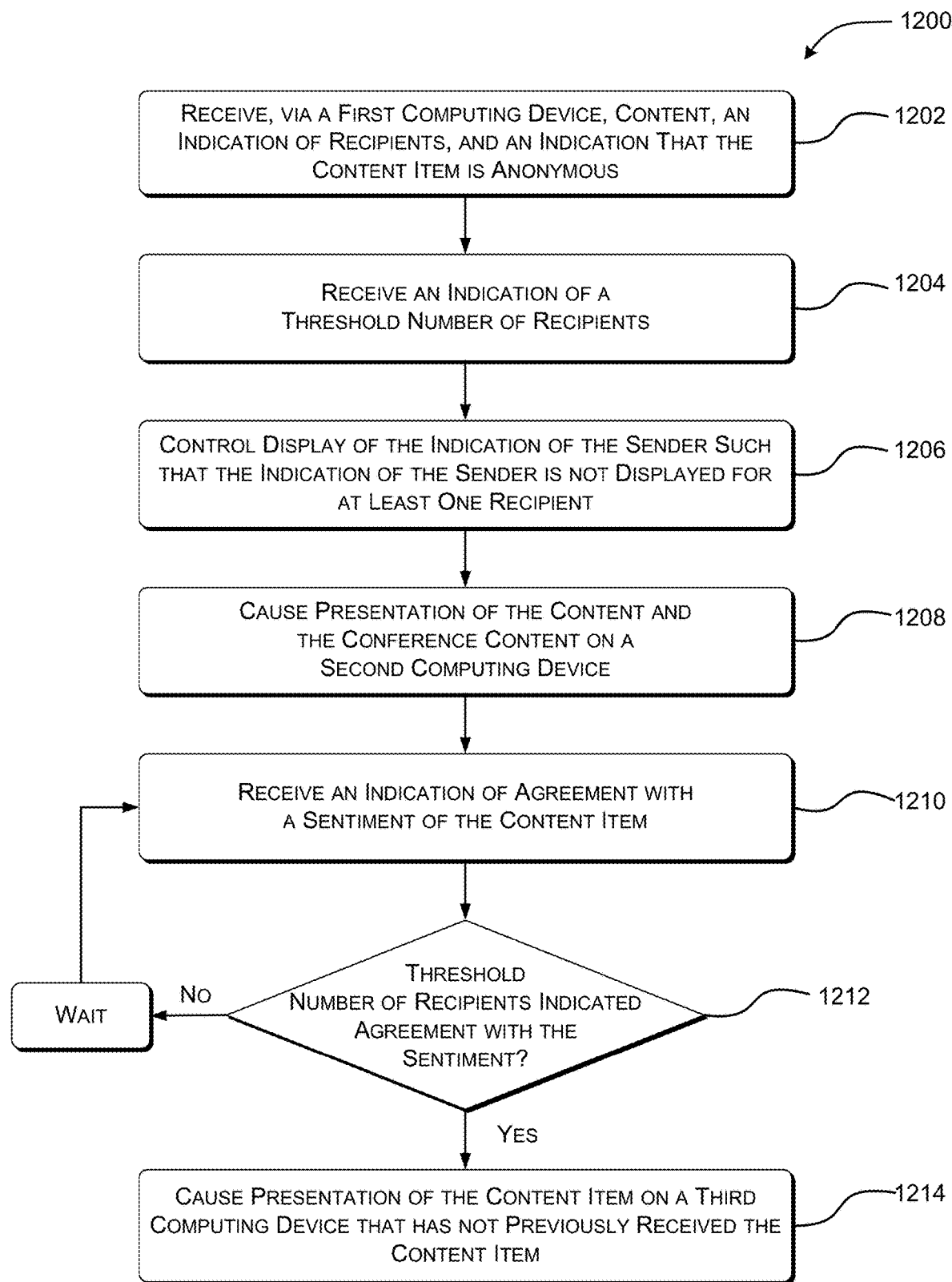
FIG. 12 is a flow diagram showing aspects of a process for "voting-up" an anonymous content item when recipients of the anonymous content item share the sentiment expressed in the anonymous content item.

FIGS. 11-12 are flow diagrams illustrating routines 1100-1200 describing aspects of the present disclosure. In various examples, operations of the routines 1100 and 1200 can be performed by the server 116 and/or a participant computing device 110. The logical operations described herein with regard to FIG. 11 and FIG. 12 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, hand-held computing devices, microprocessor-based, programmable consumer electronics, combinations thereof, and the like.

For example, the operations of the routines 1100 or 1200 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration may refer to the components of the figures, it can be appreciated that the operations of the routines 1100 and 1200 may be also implemented in many other ways. For example, the routines 1100 and 1200 may be implemented, at least in part, by another remote computer, processor, or circuit. In addition, one or more of the operations of the routines 1100 and 1200 may alternatively or additionally be implemented, at least in part, by a chipset working alone or in conjunction with other software modules. In the examples described below, one or more modules of a computing system can receive and/or process the data disclosed herein. Any service, circuit or application suitable for providing the techniques disclosed herein can be used in operations described herein.

With reference to FIG. 11, the routine 1100 begins at operation 1102 where conference content is sent to a first computing device and to a second computing device. The communication session may be a videoconference and the conference content may be a live video stream. The first computing device and the second computing device are both participating in the communication session. For example, the first computing device may be computing device 110A and the second computing device may be any of computing devices 110B-110D as shown in FIG. 1.

At operation 1104, a content item that includes content of the content item (e.g., the words in the content item), an indication of one or more recipients who are also participants in the communication session, and an indication that the content item is anonymous are received from an input region of the first UI of the first computing device. The first UI may be any of UI 122A, UI 200, UI 300, UI 700, UI 800, UI 900, or UI 1000. The first computing device is associated with a sender such as the sender 102 shown in FIG. 1. The first UI of the first computing device may display the content and the input region simultaneously. The conference content may be displayed in a video window that presents a live video stream of a videoconference.

At operation 1106, display of the indication of the sender is controlled such that the indication of the sender is not included in a UI of the second computing device associated with a recipient. Display or omission of the indication of the sender may be controlled by the server 116. Depending on the identity of a recipient and anonymization settings or preferences, the server 116 may cause the UI of the second computing device to display or not display the indication of the sender.

At operation 1108, presentation of the content and the conference content is caused to occur in a content item display region of the UI of the second computing device. The content item display region may be the content item display region 128 shown in FIG. 1 and FIG. 4 or the region for incoming anonymous content items 806 shown in FIG. 8. The communication session module 118 in the server 116 may cause the presentation of the content. The UI of the second computing device may display the conference content and the content item display region simultaneously. The conference content may be displayed in a video window that presents a live video stream of a videoconference.

The second computing device may be implemented as a collaborative computing device such as the collaborative computing device 110D shown in FIG. 1. When the content is displayed on the UI of the collaborative computing device, one or more additional participants 112 sharing the collaborative computing device may be able to view the content.

At operation 1110, display of the indication of the sender is controlled such that the indication of the sender is displayed in a UI of a third computing device. The control may include sending a username or other indication of the sender to the third computing device. The control may include decrypting data containing the identity of the sender that is already present on the third computing device. The control of the display of the indication of the sender, as mentioned above, may be regulated by the server 116.

At operation 1112, presentation of the content with an indication of the sender is caused to occur on the UI of the third computing device. The third computing device may be the computing device 110E associated with the moderator 106 as shown in FIG. 1. Alternatively, the third computing device may be a computing device 110 associated with a second one of the recipients 104 shown in FIG. 1. In this presentation, the content is not anonymous but rather is attributed because the content is presented together with an indication of the sender's identity.

With reference to FIG. 12, the routine 1200 begins at operation 1202 where a content item that includes content, an indication of recipients, and an indication that the content item is anonymous are received from a first computing device associated with a sender. This content item may be received via an input region of a UI of the first computing device. The UI may display the conference content simultaneously with the input region.

At operation 1204, an indication of a threshold number of recipients is received (displayed). This threshold number is a number of recipients that are required to indicate agreement with the sentiment of the content before the content item may be shared with a wider audience and/or before an identifier of the sender may be displayed. The threshold number may be provided by the communication session module 118, the moderator 106, or a different source. In an implementation, the sender of the anonymous content item may determine a threshold number from the UI of the first computing device that is used to generate the content such as the UI 200 shown in FIG. 2.

At operation 1206, display of the indication of the sender is controlled such that the content is displayed for a first one of the recipients and the indication of the sender is not displayed for certain other ones of the recipients. Display of the indication of the sender may be regulated by the server 116.

At operation 1208, presentation of the content item content and the conference content is caused to be displayed in a content item display region of a UI of a second computing device. The UI of the second computing device does not display the indication of the sender in this instance. The second computing device is associated with the first one of the recipients. And the UI of the second computing device displays the content simultaneously with the content item display region.

At operation 1210, an indication of agreement with a sentiment of the content item content is received from the UI of the second computing device. The indication of agreement with the sentiment of the content may be provided, for example, by use of an agreement button 402 as shown in FIG. 4. The UI of the second computing device does not display the identity of the sender in this instance. Thus, the user of the second computing device indicates agreement with the sentiment of the content item without the UI displaying the content item sender. Multiple separate recipients may additionally each indicate agreement with the sentiment of the content item on their respective computing devices.

At operation 1212, a determination is made whether at least a threshold number of recipients have indicated agreement with the sentiment of the content item content. A count or tally of recipients that have indicated agreement with the sentiment of the content item content may be tracked by the server 116. The count may be continually updated and compared to the threshold number as new indications of agreement are received.

If the number of recipients who have indicated agreement with the sentiment of the content item content is less than the threshold number, the routine 1200 returns to operation 1210 until further indications of agreement with the sentiment of the content item content are received. If the number exceeds the threshold, routine 1200 proceeds to operation 1214.

At operation 1214, the server causes presentation of the content item content in a UI of a third computing device that has not previously received the content item content to be displayed. The third computing device may be, for example, the computing device 110E of the moderator 106 shown in FIG. 1. The UI of the third computing device may be the same as or similar to the UI 500 of FIG. 5. Thus, the content item content is not presented on the third computing device until the threshold number of recipients indicates agreement with the sentiment of the content item content. The third computing device is not limited to the computing device of moderator 106 but may be the computing device(s) of any, or all, of the participants 202 in the communication session.

Figure 13:
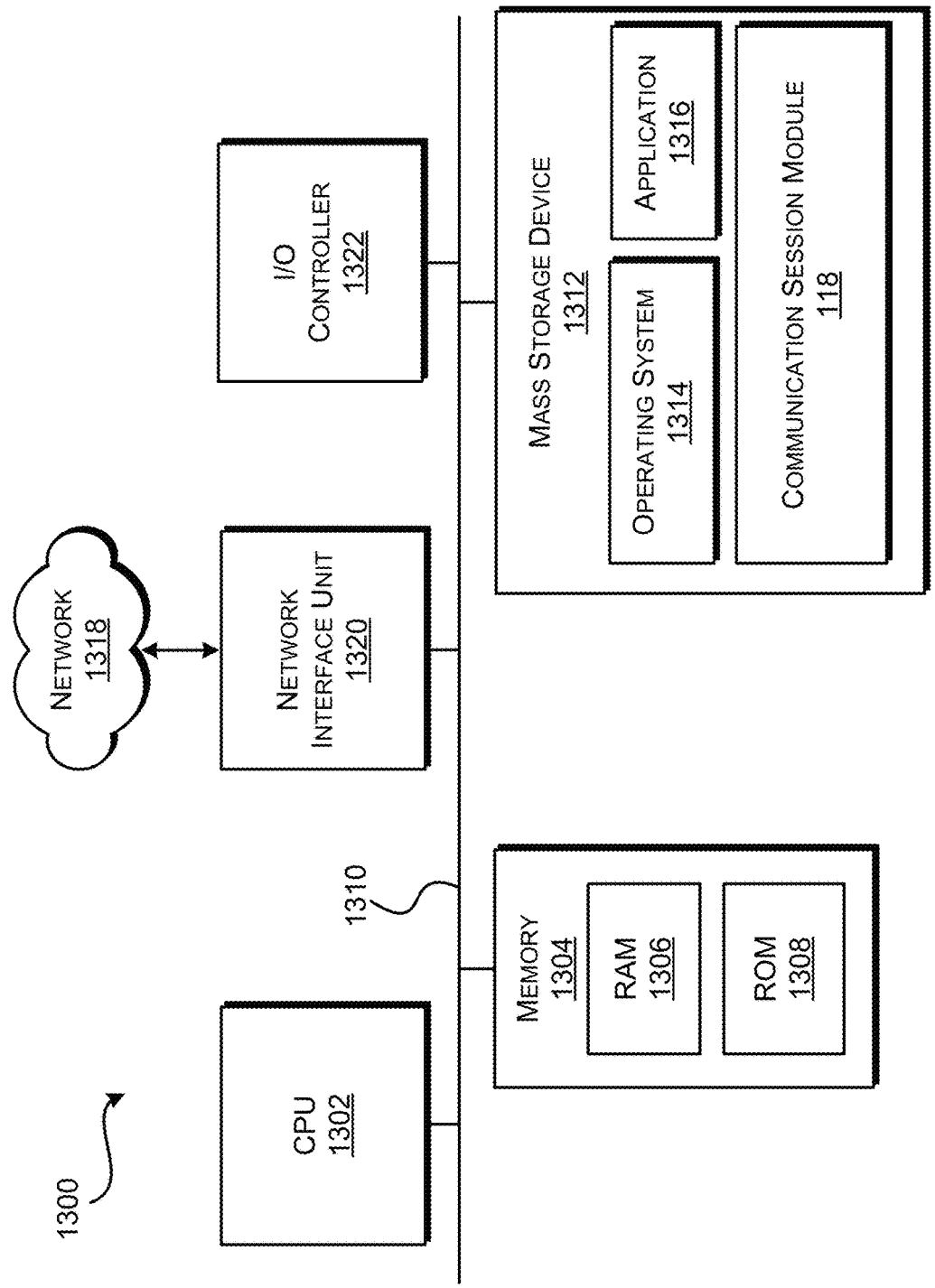
FIG. 13 is a computer architecture diagram illustrating an illustrative computer hardware and software architecture for a computing system capable of implementing aspects of the techniques and technologies presented herein.

FIG. 13 shows additional details of an example computer architecture 1300 for a computer, such as the computing devices 110 and/or the server 116 shown in FIG. 1, capable of executing the program components described herein. Thus, the computer architecture 1300 illustrated in FIG. 13 illustrates an architecture for a server computer, a mobile phone, a personal digital assistant (PDA), a smartphone, a desktop computer, a collaborative computing device, a netbook computer, a tablet computer, and/or a laptop computer. The computer architecture 1300 may be utilized to execute any aspects of the software components presented herein.

The computer architecture 1300 illustrated in FIG. 13 includes a central processing unit 1302 ("CPU"), a system memory 1304, including a random access memory 1306 ("RAM") and a read-only memory ("ROM") 1308, and a system bus 1310 that couples the memory 1304 to the CPU 1302. A basic input/output system containing the basic routines that help to transfer information between elements within the computer architecture 1300, such as during startup, is stored in the ROM 1308. The computer architecture 1300 further includes a mass storage device 1312 for storing an operating system 1314, an application 1316, a communication session module 118, and other data, applications, or programs described herein.

The mass storage device 1312 is connected to the CPU 1302 through a mass storage controller (not shown in FIG. 13) connected to the bus 1310. The mass storage device 1312 and its associated computer-readable media provide non-volatile storage for the computer architecture 1300. Although the description of computer-readable media contained herein refers to a mass storage device, such as a solid-state drive, a hard disk or a CD-ROM drive, it should be appreciated by those skilled in the art that computer-readable media can be any available computer-readable storage media or communication media that can be accessed by the computer architecture 1300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid-state memory technology, CD-ROM, digital versatile disks ("DVD"), HD-DVD, BLU-RAY, 4K Ultra HD BLU-RAY, or other optical storage, magnetic cassettes, magnetic tape, magnetic disk storage or other magnetic storage devices, or any other medium which can be used to store the desired information, and which can be accessed by the computer architecture 1300. For purposes of the claims, the phrase "computer storage medium," "computer-readable storage medium" and variations thereof, does not include waves, signals, and/or other transitory and/or intangible communication media, per se.

According to various configurations, the computer architecture 1300 may operate in a networked environment using logical connections to remote computers through the network 1318. The computer architecture 1300 may connect to the network 1318 through a network interface unit 1320 connected to the bus 1310. The computer architecture 1300 also may include an input/output controller 1322 for receiving and processing input from a number of other devices, including a keyboard, mouse, touchscreen, electronic stylus, or pen. Similarly, the input/output controller 1322 may provide output to a display screen, a printer, or another type of output device.

The software components described herein may, when loaded into the CPU 1302 and executed, transform the CPU 1302 and the overall computer architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules disclosed herein. These computer-executable instructions may transform the CPU 1302 by specifying how the CPU 1302 transitions between states, thereby transforming the transistors or other discrete hardware elements constituting the CPU 1302.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 may include other types of computing devices, including hand-held computers, embedded computer systems, personal digital assistants, and other types of computing devices known to those skilled in the art. It is also contemplated that the computer architecture 1300 may not include all of the components shown in FIG. 13, may include other components that are not explicitly shown in FIG. 13, or may utilize an architecture completely different than that shown in FIG. 13.

Figure 14:
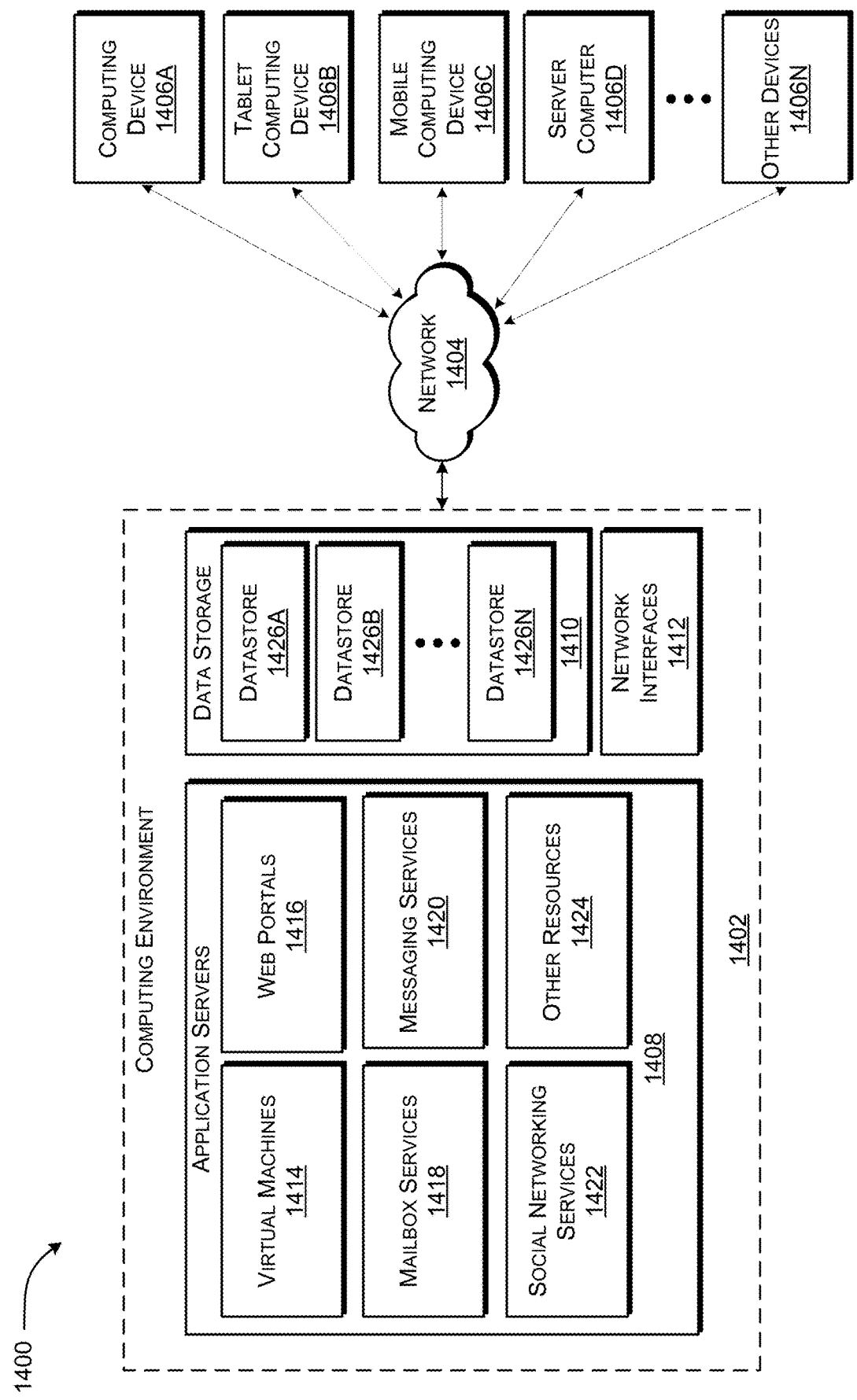
FIG. 14 is a diagram illustrating a distributed computing environment capable of implementing aspects of the techniques and technologies presented herein.

FIG. 14 depicts an illustrative distributed computing environment 1400 capable of executing the software components described herein. Thus, the distributed computing environment 1400 illustrated in FIG. 14 can be utilized to execute any aspects of the software components presented herein.

According to various implementations, the distributed computing environment 1400 includes a computing environment 1402 operating on, in communication with, or as part of the network 1404. One or more client devices 1406A-1006N (hereinafter referred to collectively and/or generically as "clients 1406" and also referred to herein as computing devices 1406) can communicate with the computing environment 1402 via the network 1404.

In one illustrated configuration, the clients 1406 include a computing device 1406A such as a laptop computer, a desktop computer, a collaborative computing device, or other computing device; a slate or tablet computing device ("tablet computing device") 1406B; a mobile computing device 1406C such as a mobile telephone, a smartphone, or other mobile computing device; a server computer 1406D; and/or other devices 1406N. It should be understood that any number of clients 1406 can communicate with the computing environment 1402.

In the illustrated configuration, the computing environment 1402 includes application servers 1408, data storage 1410, and one or more network interfaces 1412. According to various implementations, the functionality of the application servers 1408 can be provided by one or more server computers that are executing as part of, or in communication with, the network 1404. The application servers 1408 can host various services, virtual machines, portals, and/or other resources.

In the illustrated configuration, the application servers 1408 host one or more virtual machines 1414 for hosting applications or other functionality. According to various implementations, the virtual machines 1414 host one or more applications and/or software modules for implementing aspects of the functionality disclosed herein. It should be understood that this configuration is illustrative and should not be construed as being limiting in any way. The application servers 1408 can also host or provide access to one or more portals, link pages, Web sites, and/or other information ("Web portals") 1416.

According to various implementations, the application servers 1408 also include one or more mailbox services 1418 and one or more messaging services 1420. The mailbox services 1418 can include electronic mail ("email") services. The mailbox services 1418 also can include various personal information management ("PIM") and presence services including, but not limited to, calendar services, contact management services, collaboration services, and/or other services. The messaging services 1420 can include, but are not limited to, video conferencing services, audio conferencing services, instant messaging services, chat services, forum services, and/or other communication services.

The application servers 1408 also may include one or more social networking services 1422. The social networking services 1422 can include various social networking services including, but not limited to, services for sharing or posting status updates, instant messages, links, photos, videos, and/or other information; services for commenting or displaying interest in articles, products, blogs, or other resources; and/or other services.

As shown in FIG. 14, the application servers 1408 also can host other services, applications, portals, and/or other resources ("other resources") 1424. The other resources 1424 can include, but are not limited to, workspace collaboration, document sharing, rendering or any other functionality. It thus can be appreciated that the computing environment 1402 can provide integration of the concepts and technologies disclosed herein with various mailbox, messaging, social networking, and/or other services or resources.

As mentioned above, the computing environment 1402 can include the data storage 1410. According to various implementations, the functionality of the data storage 1410 is provided by one or more databases operating on, or in communication with, the network 1404. The functionality of the data storage 1410 also can be provided by one or more server computers configured to host data for the computing environment 1402. The data storage 1410 can include, host, or provide one or more real or virtual datastores 1426A-1026N (hereinafter referred to collectively and/or generically as "datastores 1426").

The datastores 1426 are configured to host data used or created by the application servers 1408 and/or other data. Although not illustrated in FIG. 14, the datastores 1426 also can host or store web page documents, word documents, presentation documents, data structures, algorithms for execution by a recommendation engine, and/or other data utilized by any application program or another module. Aspects of the datastores 1426 may be associated with a service for storing data units such as files.

The computing environment 1402 can communicate with, or be accessed by, the network interfaces 1412. The network interfaces 1412 can include various types of network hardware and software for supporting communications between two or more computing devices including, but not limited to, the computing devices and the servers. It should be appreciated that the network interfaces 1412 also may be utilized to connect to other types of networks and/or computer systems.

It should be understood that the distributed computing environment 1400 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1400 provides the software functionality described herein as a service to the computing devices.

It should also be understood that the computing devices can include real or virtual machines including, but not limited to, server computers, web servers, personal computers, mobile computing devices, smartphones, and/or other devices. As such, various configurations of the concepts and technologies disclosed herein enable any device configured to access the distributed computing environment 1400 to utilize the functionality described herein for providing the techniques disclosed herein, among other aspects. In one specific example, as summarized above, techniques described herein may be implemented, at least in part, by a web browser application, which works in conjunction with the application servers 1408 of FIG. 14.

The disclosure presented herein also encompasses the subject matter set forth in the following clauses.

Clause 1: A method for disseminating anonymous content items during a communication session, the method comprising: receiving, via an input region of a user interface of a first computing device associated with a sender, a content item comprising content, an indication of recipients, and an indication that the content item is anonymous, wherein the user interface of the first computing device simultaneously displays conference content and the input region; controlling display of an indication of the sender in a user interface of a second computing device associated with a first one of the recipients such that the indication of the sender is not included; causing presentation of, via a content item display region of the user interface of the second computing device, the content and the conference content; controlling display of the indication of the sender in a user interface of a third computing device associated with a second one of the recipients such that the indication of the sender is included; and causing presentation of, via the user interface of the third computing device associated with the second one of the recipients, the content and the indication of the sender.

Clause 2: The method of Clause 1, wherein the communication session comprises a videoconference, the conference content comprises a live video stream, the user interface of the first computing device includes a first video window displaying the live video stream, and the user interface of the second computing device includes a second video window displaying the live video stream.

Clause 3: The method of any of clauses 1-2, wherein the sender is a participant in the communication session, the first one of the recipients is another participant in the communication session, and the second one of the recipients is a moderator of the communication session.

Clause 4: The method of any of clauses 1-3, wherein the second computing device comprises a collaborative computing device implemented as a digital whiteboard that is used by the first one of the recipients together with at least one additional participant in the communication session.

Clause 5: The method of any of clauses 1-4, receiving, via the user interface of the first computing device, an indication of a time delay, and wherein the causing presentation, via the content item display region of the user interface of the second computing device comprises causing presentation of the content after the time delay.

Clause 6: The method any of clauses 1-5, further comprising receiving, via the user interface of the first computing device, an indication of one of a plurality of predetermined categories representative of the content item.

Clause 7: The method of clause 6, wherein the second one of the recipients is determined based on the indication of one of the plurality of predetermined categories.

Clause 8: The method of any of clauses 1-7, wherein the content comprises a response to a poll having a plurality of selectable responses.

Clause 9: The method of Clause 8, wherein a one of the plurality of selectable responses is an indication of a sentiment regarding behavior of a participant in the communication session.

Clause 10: A system for disseminating anonymous feedback regarding a communication session comprising: one or more processing units; and a computer-readable medium having computer-executable instructions encoded thereon to cause the one or more processing units to: send conference content to a first computing device and a second computing device, wherein the first computing device and the second computing device are both participating in the communication session; receive, via a first user interface of the first computing device, a content item comprising content, an indication of one or more recipients who are also participants in the communication session, and an indication that the content item is anonymous, wherein the first computing device is associated with a sender; and control display, via a second user interface of the second computing device, of the content such that the indication of the sender is omitted, wherein the second computing device is associated with at least one of the one or more recipients and the user interface of the second computing device simultaneously display the content and the conference content.

Clause 11: The system of clause 10, wherein the first user interface comprises a first input region for anonymous content items and a second input region for attributed content items.

Clause 12: The system of any of clauses 10-11, wherein the first user interface comprises a touchscreen and the indication that the content item is anonymous comprises handwritten content item content in a predetermined region of the touchscreen.

Clause 13: The system of any of clauses 10-11, wherein the first user interface comprises a touchscreen and the indication that the content item is anonymous comprises a handwritten predetermined symbol in proximity to the content item content.

Clause 14: The system of any of clauses 10-11, wherein the first user interface comprises a touchscreen and the indication that the content item is anonymous comprises handwriting of the content item content with an anonymous pen.

Clause 15: The system of any of clauses 10-14, wherein the computer-executable instructions further cause the one or more processing units to: determine that the second computing device is a collaborative computing device implemented as a digital whiteboard; and cause the digital whiteboard to display the content in a predetermined region designated for anonymous content items.

Clause 16: A computer-readable storage medium having computer-executable instructions encoded thereon to cause a computing device to: receive, via an input region of a user interface of a first computing device associated with a sender a content item comprising content, an indication of recipients, and an indication that the content item is anonymous, wherein the user interface of the first computing device displays conference content simultaneously with the input region; control display of an indication of the sender in a user interface of a second computing device associated with a first one of the recipients such that the indication of the sender is not included in the user interface; cause presentation, via a content item display region of the user interface of the second computing device associated with the first one of the recipients, of the content and the conference content; and receive, via the user interface of the second computing device, an indication of agreement with a sentiment of the content item.

Clause 17: The computer-readable storage medium of clause 16, wherein the computer-executable instructions cause the computing device to: determine that at least a threshold number of the recipients have indicated agreement with the sentiment of the content item; and cause presentation, via a user interface of a third computing device that has not previously received the content item, of the content.

Clause 18: The computer-readable storage medium of any of clauses 16-17, wherein the presentation of the content via the user interface of the third computing device includes presentation of a number of participants that have indicated agreement with the sentiment of the content item.

Clause 19: The computer-readable storage medium of any of clauses 17-18, wherein presentation of the content includes display of the indication of the sender.

Clause 20: The computer-readable storage medium of clause 19, wherein the computer-executable instructions cause the computing device to: receive, via the user interface of the first computing device, an indication of a threshold number of the recipients required to indicate agreement with the sentiment of the content before presentation of the indication of the sender.

The terms "a," "an," "the" and similar referents used in the context of describing the invention including in the following claims are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two computing devices, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and are not to be construed as limiting the scope of the claims.

The invention claimed is:

1. A method for disseminating anonymous content items during a communication session, the method comprising:
    receiving, via an input region of a first user interface of a first computing device comprising a touchscreen and associated with a sender, a content item comprising content, an indication of one or more recipients, and an indication that the content item is anonymous, wherein the first user interface of the first computing device simultaneously displays conference content and the input region, and wherein the indication that the content item is anonymous comprises at least one of (i) handwritten content item content in a predetermined region of the touchscreen, (ii) a handwritten predetermined symbol in proximity to the content item content, or (iii) handwriting of the content item content with an anonymous pen; and
    controlling display of an indication of the sender in a second user interface of a second computing device associated with a first one of the one or more recipients such that the indication of the sender is not included, wherein the second user interface of the second computing device simultaneously displays the content and the conference content.

2. The method of claim 1, wherein the communication session comprises a videoconference, the conference content comprises a live video stream, the user interface of the first computing device includes a first video window displaying the live video stream, and the second user interface of the second computing device includes a second video window displaying the live video stream.

3. The method of claim 1, wherein the second computing device comprises a collaborative computing device implemented as a digital whiteboard that is used by the first one of the one or more recipients together with at least one additional participant in the communication session.

4. The method of claim 1, further comprising receiving, via the first user interface of the first computing device, an indication of one of a plurality of predetermined categories representative of the content item.

5. The method of claim 4, wherein a second one of the one or more recipients is determined based on the indication of one of the plurality of predetermined categories.

6. The method of claim 1, wherein the content comprises a response to a poll having a plurality of selectable responses.

7. The method of claim 6, wherein a one of the plurality of selectable responses is an indication of a sentiment regarding behavior of a participant in the communication session.

8. The method of claim 1, wherein the handwritten predetermined symbol is a word, multiple words, a single character, a single character surrounded by a circle, or an arbitrary symbol.

9. The method of claim 1, wherein the anonymous pen is a physical stylus recognized by the first user interface as an anonymous pen.

10. A system for disseminating anonymous feedback regarding a communication session comprising:
    one or more processing units; and
    a computer-readable medium having computer-executable instructions encoded thereon to cause the one or more processing units to:
        send conference content to a first computing device and a second computing device, wherein the first computing device and the second computing device are both participating in the communication session;
        receive, via a first user interface of the first computing device comprising a touchscreen, a content item comprising content, an indication of one or more recipients who are also participants in the communication session, and an indication that the content item is anonymous, wherein the first computing device is associated with a sender, and wherein the indication that the content item is anonymous comprises at least one of (i) comprises handwritten content item content in a predetermined region of the touchscreen, (ii) a handwritten predetermined symbol in proximity to the content item content, or (iii) handwriting of the content item content with an anonymous pen; and
        control display, via a second user interface of the second computing device, of the content such that the indication of the sender is omitted, wherein the second computing device is associated with at least one of the one or more recipients and the second user interface of the second computing device simultaneously displays the content and the conference content.

11. The system of claim 10, wherein the computer-executable instructions further cause the one or more processing units to:
    determine that the second computing device is a collaborative computing device implemented as a digital whiteboard; and cause the digital whiteboard to display the content in a predetermined region designated for anonymous content items.

12. The system of claim 10, wherein the handwritten predetermined symbol is a word, multiple words, a single character, a single character surrounded by a circle, or an arbitrary symbol.

13. The system of claim 10, wherein the anonymous pen is a physical stylus recognized by the first user interface as an anonymous pen.

14. A computer-readable storage medium having computer-executable instructions encoded thereon to cause a computing device to:
receive, via an input region of a first user interface of a first computing device comprising a touchscreen and associated with a sender a content item comprising content, an indication of recipients, and an indication that the content item is anonymous, wherein the first user interface of the first computing device displays conference content simultaneously with the input region and wherein the indication that the content item is anonymous comprises at least one of (i) handwritten content item content in a predetermined region of the touchscreen, (ii) a handwritten predetermined symbol in proximity to the content item content, or (iii) handwriting of the content item content with an anonymous pen; and
control display of an indication of the sender in a second user interface of a second computing device associated with a first one of the recipients such that the indication of the sender is not included in the user interface, wherein the second user interface of the second computing device displays the content simultaneously with the conference content.

15. The computer-readable storage medium of claim 14, wherein the computer-executable instructions encoded thereon to cause the computing device to receive an indication of agreement with a sentiment contained in the content of the content item from at least a threshold number of the recipients.

16. The computer-readable storage medium of claim 15, wherein the computer-executable instructions encoded thereon to cause the computing device to cause presentation, via a third user interface of a third computing device that has not previously received the content item, of the content.

17. The computer-readable storage medium of claim 16, wherein the presentation of the content via the user interface of the third computing device includes presentation of a number of participants that have indicated agreement with the sentiment of the content item.

18. The computer-readable storage medium of claim 14, wherein the computer-executable instructions encoded thereon to cause the computing device to:
determine that the second computing device is a collaborative computing device implemented as a digital whiteboard; and
cause the digital whiteboard to display the content in a predetermined region designated for anonymous content items.

19. The computer-readable storage medium of claim 14, wherein the handwritten predetermined symbol is a word, multiple words, a single character, a single character surrounded by a circle, or an arbitrary symbol.

20. The computer-readable storage medium of claim 14, wherein the anonymous pen is a physical stylus recognized by the first user interface as an anonymous pen.

* * * * *